US005936651A

United States Patent [19]

Uchida et al.

[11] Patent Number: 5,936,651

[45] Date of Patent: Aug. 10, 1999

[54] RECORDING MEDIUM CONVEYING MECHANISM FOR IMAGE RECORDING APPARATUS

[75] Inventors: Takashi Uchida; Tomohiro Aoki, both of Yokohama; Yasushi Murayama, Tokyo; Tatsuo Mitomi; Masaharu Nemura, both of Yokohama, all of Japan

[73] Assignee: Canon Kabushiki Kaisha, Tokyo, Japan

[21] Appl. No.: 08/430,171

[22] Filed: Apr. 27, 1995

Related U.S. Application Data

[60] Continuation of application No. 08/070,880, Jun. 3, 1993, abandoned, which is a division of application No. 07/829, 552, Feb. 5, 1992, Pat. No. 5,245,364, which is a continuation of application No. 07/459,123, Dec. 29, 1989, abandoned.

[30] Foreign Application Priority Data

Dec. 30, 1988 [JP] Japan .................................. 63-331036

[51] Int. Cl.[6] .............................. B41J 2/01; G01D 15/16; G01D 15/18

[52] U.S. Cl. ........................ 347/104; 346/139 A; 347/105

[58] Field of Search .................................... 347/4, 8, 219, 347/104, 43, 218, 173, 139, 164, 153, 154, 262, 264, 115; 346/134, 136, 139 A; 355/271, 327; 400/55–59, 616.3, 82, 635, 636.3, 120 MC, 662; 271/275, 198

[56] References Cited

U.S. PATENT DOCUMENTS

| | | | |
|---|---|---|---|
| 3,560,988 | 2/1971 | Krick | 347/104 |
| 4,207,579 | 6/1980 | Gamblin et al. | 347/104 |
| 4,364,067 | 12/1982 | Koto et al. . | |
| 4,447,817 | 5/1984 | Naramore | 346/75 |
| 4,493,566 | 1/1985 | McMahon et al. | 400/59 |
| 4,537,125 | 8/1985 | Gaucher | 400/635 |
| 4,636,100 | 1/1987 | Fujisawa | 400/662 |
| 4,692,778 | 9/1987 | Yoshimura et al. | 346/145 |
| 4,703,333 | 10/1987 | Hubbard . | |
| 4,712,906 | 12/1987 | Bothner et al. | 355/3 TR |
| 4,720,200 | 1/1988 | Gomoll et al. | 400/59 |
| 4,723,129 | 2/1988 | Endo et al. . | |
| 4,740,796 | 4/1988 | Endo et al. . | |
| 4,821,049 | 4/1989 | Eckl | 346/134 |
| 4,833,488 | 5/1989 | Mizutani et al. . | |
| 4,974,033 | 11/1990 | Yamada et al. | 355/319 |
| 5,017,969 | 5/1991 | Mitomi et al. | 355/271 |
| 5,136,307 | 8/1992 | Uchida et al. | 346/136 |
| 5,245,364 | 9/1993 | Uchida et al. | 347/104 |

FOREIGN PATENT DOCUMENTS

| | | | |
|---|---|---|---|
| 2803698 | 8/1978 | Germany | 347/104 |
| 56-148583 | 11/1981 | Japan . | |
| 0089187 | 5/1984 | Japan | 400/58 |
| 59-184379 | 10/1984 | Japan | 355/271 |
| 206658 | 10/1985 | Japan | 347/8 |
| 0225077 | 10/1986 | Japan | 400/58 |
| 118366 | 5/1987 | Japan . | |
| 2135634 | 9/1984 | United Kingdom . | |

OTHER PUBLICATIONS

Curran et al, "Tensioning System For Photoconductor Belt", vol. 24, No. 10, Mar. 1982, pp. 5019–5020.

Dahlen, "Variable Speed Driver", Dec. 1982, IBM Tech Disclosure, vol. 25, No. 7A.

*Primary Examiner*—N. Le

*Assistant Examiner*—Thinh Nguyen

*Attorney, Agent, or Firm*—Fitzpatrick, Cella, Harper & Scinto

[57] ABSTRACT

An image recording apparatus is equipped with a conveying belt member for carrying a sheet member, a recording head holding member for holding a head for recording on the sheet member, and guide members for supporting and guiding the conveying belt member. The first guide member is provided upstream of the recording head holding member, the second guide is provided downstream of the first guide, and the third guide is provided between the first and second guides. The third guide member displaces the conveying belt member toward the recording head holding member.

6 Claims, 37 Drawing Sheets

RECORDING MEDIUM CONVEYING MECHANISM FOR IMAGE RECORDING APPARATUS

This application is a continuation of application Ser. No. 08/070,880 filed Jun. 3, 1993, now abandoned, which is a divisional of application Ser. No. 07/829,552 filed Feb. 5, 1992, now U.S. Pat. No. 5,245,364, which is a continuation of application Ser. No. 07/459,123 filed Dec. 29, 1989, abandoned.

BACKGROUND OF THE INVENTION

1. Field of the Invention

The present invention relates to an ink jet recording apparatus having the functions of facsimile, copying machine, printer and the like, or usable as an output apparatus for a composite equipment, a work station and the like having such functions.

Also the present invention relates particularly to an ink jet recording apparatus having, as recording means, a so-called ink jet recording head of a full-line type having a recording width corresponding to the maximum recording width of a recording medium, or having a plurality of such recording heads for black ink or for inks of respectively different colors.

2. Related Background Art

Non-impact recording methods are recently attracting attention due to their advantage that the noise level during the recording operation is negligibly low. Among these methods, ink jet recording is particularly promising because of the possibility of high speed recording and the capability of recording on ordinary paper without particular fixing treatment.

The recording head employed in the ink jet recording apparatus is generally provided with a small liquid discharge port (orifice), a liquid path, an energy applying part formed in said liquid path, and energy generating means for generating energy for liquid droplet formation, to be applied to the liquid present in said energy applying part.

For such energy generating means there are already known electromechanical converting members, such as a piezoelectric element; means for irradiation with an electromagnetic wave, such as a laser beam, which is absorbed in the liquid and generates heat therein for generating and discharging a liquid droplet; and a electrothermal converting elements such as a heat-generating resistors for heating the liquid thereby discharging a liquid droplet. Among these, a recording head for causing liquid droplet discharge by thermal energy has various advantages as disclosed in the U.S. Pat. Nos. 4,740,796 and 4,723,1219.

In contrast to the so-called serial scanning recording method in which the printing is conducted by reciprocating motion of the recording head on a stopped recording sheet, U.S. Pat. No. 4,692,778 discloses a fixed recording head consisting of an array of plural recording heads and enabling full-line printing. Said patent discloses various apparatuses, many of which have already been reduced to practice.

However a full-line recording head obtained by combining plural recording heads is expensive, and a complex structure is required for the positioning of each head. Also the entire recording head becomes inevitably bulky if plural full-line recording heads are employed.

Numerous designs of full-line recording heads consisting of a long single head for satisfying the requirements of compactization of the apparatus, stable image formation and high speed recording have been made, but have been unable, in any design, to avoid the drawbacks related to the means for recovering the discharge function of the recording head.

The present inventors have therefore reached a novel structure capable of preventing the drawbacks mentioned above.

The inventors of the present invention assumed it as a technical theme to make the equipment compact and reduce the complexity required for improving recording precision, by moving the recording member and by providing a recording region forming method which is particularly useful for ink recording apparatus but is applicable to various other recording apparatuses.

SUMMARY OF THE INVENTION

In the case of this type of image recording apparatus (especially ink jet recording apparatus), it is indispensable that carrier belt slidingly moves on the platen but the resistance of the platen tends to increase at its corner and it sometimes causes deterioration of accuracy of movement of the said carrier belt. When ink jet which must be placed on the same spot by each head is placed at the spot different from the desired spot and when such deviation is excessive, it results in the aberration of color which severely deteriorates the quality of image.

Especially when the member is carried while tightly adhering to the carrier belt due to electrostatic attraction, the said problem tends to become extremely remarkable and the advantage of carrying the member by electrostatic attraction may not be duly exploited.

The present invention aims at the solution of the aforesaid problem. Another objective of this invention is to provide the apparatus with such construction that in order to maintain constant distance between the nozzle surface of the recording head and the printed surface of the recording sheet, a rotatively supported carrier guide is provided at the inside of the carrier belt to carry the recording sheet and the pushing member provided on the said carrier guide is brought in contact with the recording head or the recording head positioning means.

BRIEF DESCRIPTION OF THE DRAWINGS

FIGS. 18-1 and 18-2 are flow charts of control sequence of the entire apparatus of the embodiment;

DESCRIPTION OF THE PREFERRED EMBODIMENTS

Now the present invention will be clarified in detail by embodiments thereof shown in the attached drawings.

Figure 1:
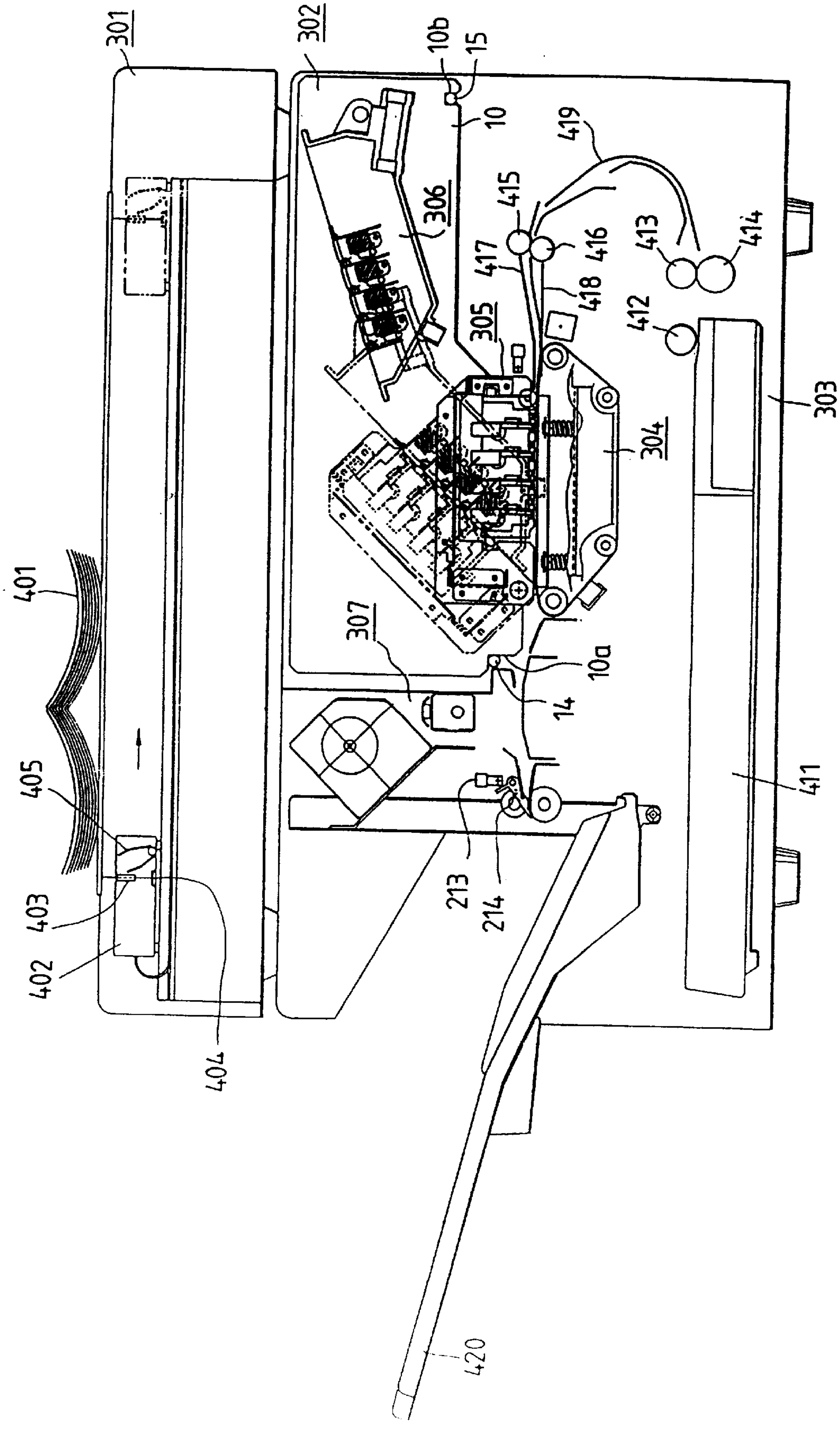
FIG. 1 is a schematic cross-sectional view of an embodiment of the ink jet recording apparatus of the present invention.

FIG. 1 is a schematic cross-sectional view of an embodiment of the ink jet recording apparatus of the present invention. A scanner unit 301 reads an original document and converts it into an electrical signal, and a drive signal based on said signal is supplied to a recording head unit 305 of a printer unit 302. Recording sheets, constituting recording materials, or recording media, and stored in a sheet feed unit 303 are advanced, one by one when needed, to a belt conveyor unit 304. In passing said belt conveyor unit 304, the recording sheet is subjected to image recording by said recording head unit 305, and is then advanced to a tray 420 through a fix/exhaust unit 307. A recovery capping unit 306 serves to maintain said recording head unit 305 always in a recordable state. The detailed structure of these units will be explained in the following.

Figure 16:
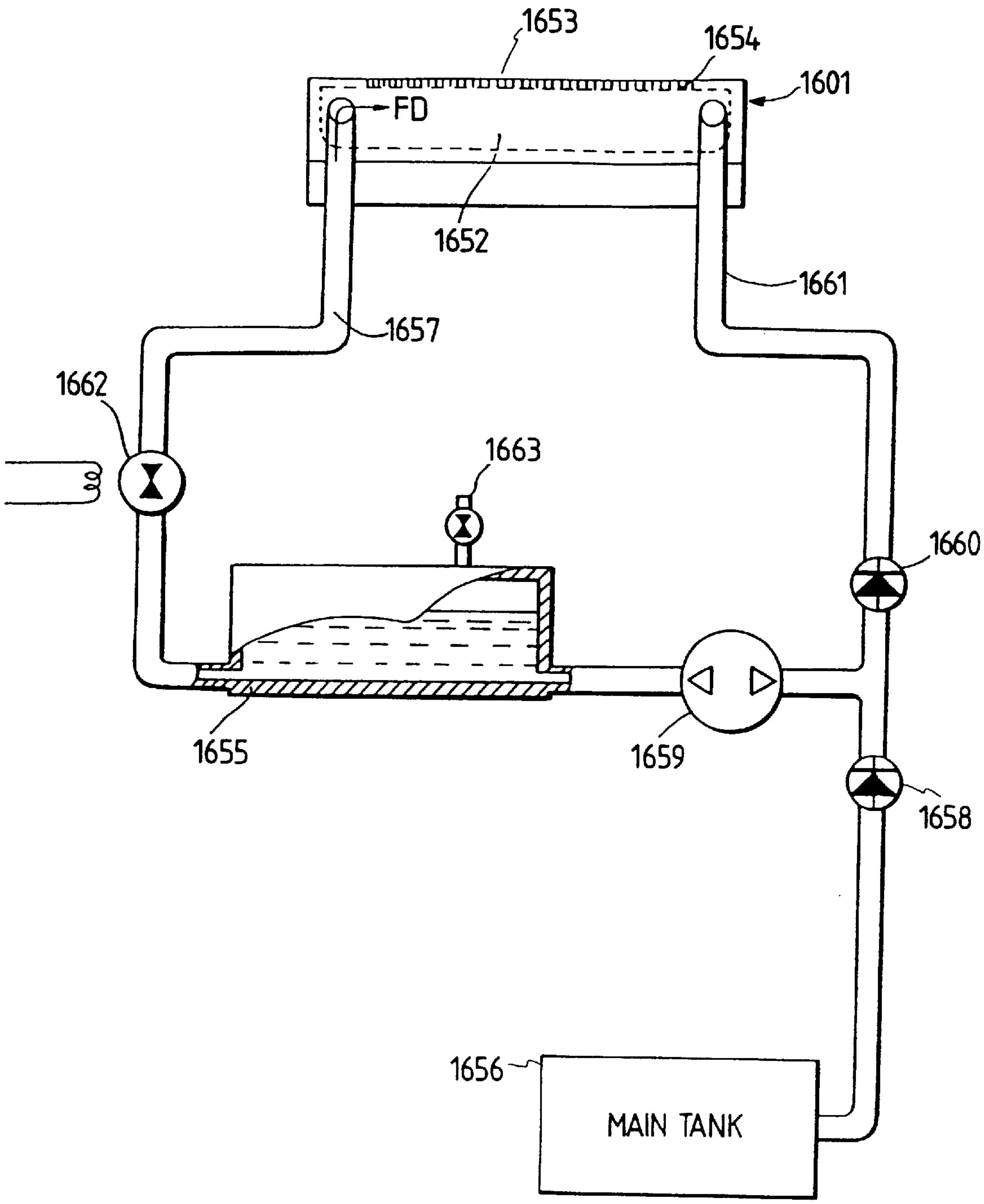
FIG. 16 is a schematic view showing the structure of a long recording head and ink supply means.

At first reference is made to FIG. 16, for explaining the ink supply to a long full-line recording head employed in the present embodiment. FIG. 16 schematically shows the structure of said long recording head and ink supply means, wherein shown are a recording head 1601, a common liquid chamber 1652, and liquid discharge ports 1653 formed on a liquid discharge face 1654. The discharge ports 1653 of the present embodiment are arranged almost in accordance with the maximum recordable width of the recording material, and the recording liquid is discharged by selective drive of heat-generating elements provided in unrepresented liquid paths communicating with said discharge ports 1653, thereby achieving recording without a scanning motion of the recording head itself.

There are also shown a liquid supply tank 1655 for supplying the recording head 1601 with the recording liquid, and a main tank 1656 for replenishing the recording liquid in said supply tank 1655. The recording liquid is supplied from the supply tank 1655 through a supply tube 1657 to the common liquid chamber 1652 of the recording head 1601. In the replenishing of the recording liquid, it can be replenished into the supply tank 1655 from the main tank 1656, through a one-directional check valve 1658 and a recovery pump 1659. There are also provided a one-directional check valve 1660 used in the recovery operation of the discharge function of the recording head 1601, a circulating pipe 1661 containing said check valve 1660, a solenoid valve 1662 provided in said first supply pipe 1657, and an air discharge valve 1663 for the supply tank.

In such recording head 1601 and associated supply and recovery systems, the solenoid valve 1662 is maintained open at the recording, whereby the recording liquid is supplied by gravity from the supply tank 1655 to the common liquid chamber 1652 and then to the discharge ports through unrepresented liquid paths. In the recovery operation for eliminating the bubbles remaining in the common liquid chamber or in the supply system and cooling the recording head 1601, the recovery pump 1659 is activated to feed the recording liquid through the circulating pipe 1661 to the common liquid chamber 1652 and to return the recording liquid therefrom to the supply tank 1655 through the first supply pipe 1657. Also at the initial filling of the liquid paths, the solenoid valve 1662 is closed and the pump 1659 is activated to pressurize the recording liquid to the common liquid chamber 1652 through the circulating pipe 1661, thereby discharging the recording liquid from the discharge ports 1653 together with the discharge of bubbles.

Such recording head, in normal non-recording state, is left with the ink inside the discharge ports. Thus there is provided capping means with a cap member capable of fitting to or on a face of the recording head having the discharge ports and said cap is fitted on the recording head in the non-recording state, whereby the recording head is covered and tightly sealed from surrounding atmosphere. In addition the space formed by the cap and the recording head is filled with the vapor of the ink to the saturated vapor pressure thereof, thereby preventing the ink evaporation in the liquid paths, and the increase in viscosity or drying of the ink in the liquid paths resulting therefrom. However, in a low humidity situation or in a prolonged pause between recording operations, the increase in ink viscosity may still occur even when the ink evaporation is prevented by the capping as explained above, so that failure or unstability in ink discharge may be encountered in the recording after a pause. In the present text, the term "first discharge problem" means failure of first ink discharge after a pause, there is also used the ink circulating/pressurizing means for circulating the ink under pressure by the recovery pump 1659 as explained above, thereby discharging the ink from all the discharge ports of the recording head. On the other hand, if said failure in discharge is slight, all the energy generating means of the recording head are activated to effect the ink discharge in the same manner as in the recording operation. Such ink discharge will be called "idle discharge" in the present text, in order to distinguish it from the ink discharge for image recording.

As explained above, the recording head recovers the recordable state either by the pressurized circulation of ink in case the ink becomes viscous or is dried in the discharge port and/or liquid path after a prolonged non-recording state, or by an idle discharge operation if such ink drying is slight after a relatively short non-recording state.

In the following there will be explained the recording material advantageously employed in the present embodiment.

In the ink jet recording method, a liquid droplet of recording liquid, called ink, is emitted and deposited on a recording sheet such as paper. Therefore the ink should not ooze excessively on the sheet in order not to blur the print. Also the recording material should preferably be capable of rapidly absorbing the ink deposited thereon, not allowing oozing or leaking of ink even when the inks of different colors are deposited in a same place within a short time, and suppressing the spreading of the print dot to the extent of deteriorating the sharpness of image. These requirements are often not sufficiently satisfied by the copying paper ordinarily employed in the electrophotographic copying machines or by other usual recording papers. These sheets can often provide satisfactory image quality in the printing of a single color or two superposed colors, but cannot frequently provide satisfactory image quality when the amount of ink deposited on the sheet increases, as in the printing of a full-color image recording with three or more colors.

In the ink jet recording apparatus of the present embodiment, there is preferably employed, as the sheet satisfying the above-mentioned requirements, a recording material composed of a base paper having a coating satisfying said requirements, for example fine powder of silica, as disclosed in the Japanese Laid-Open Patent Sho 56-148583. The ink is deposited on the coated face of the recording material. Consequently, in the present embodiment, there is selectively used such coated paper in case of image recording with inks of three or more colors for achieving higher image quality, or a non-coated paper in case of image recording with one or two colors. However it is naturally possible to record an image of one or two colors on such coated paper.

In the scanner unit 301, there are shown an original document 401, and an original scanning unit 402, which incorporates a rod lens array 403, a same-size color separating line sensor (color image sensor) 404, and exposure means 405. At least while the original scanning unit 402 is moved in a direction A for reading the image of the original 401 placed on an original support plate, an exposure lamp in the exposure means 405 of the scanning unit 402 is turned on, and the reflected light from the original 401 is guided through the rod lens array 403 and is focused on the line sensor 404 (hereinafter called image sensor) for reading the color image information of the original in respective colors and converting said information into digital signals. Said digital signals are transmitted to the printer unit 402, and the recording head of each color effects liquid discharge by receiving drive signals based on said digital signals.

Figure 2A:
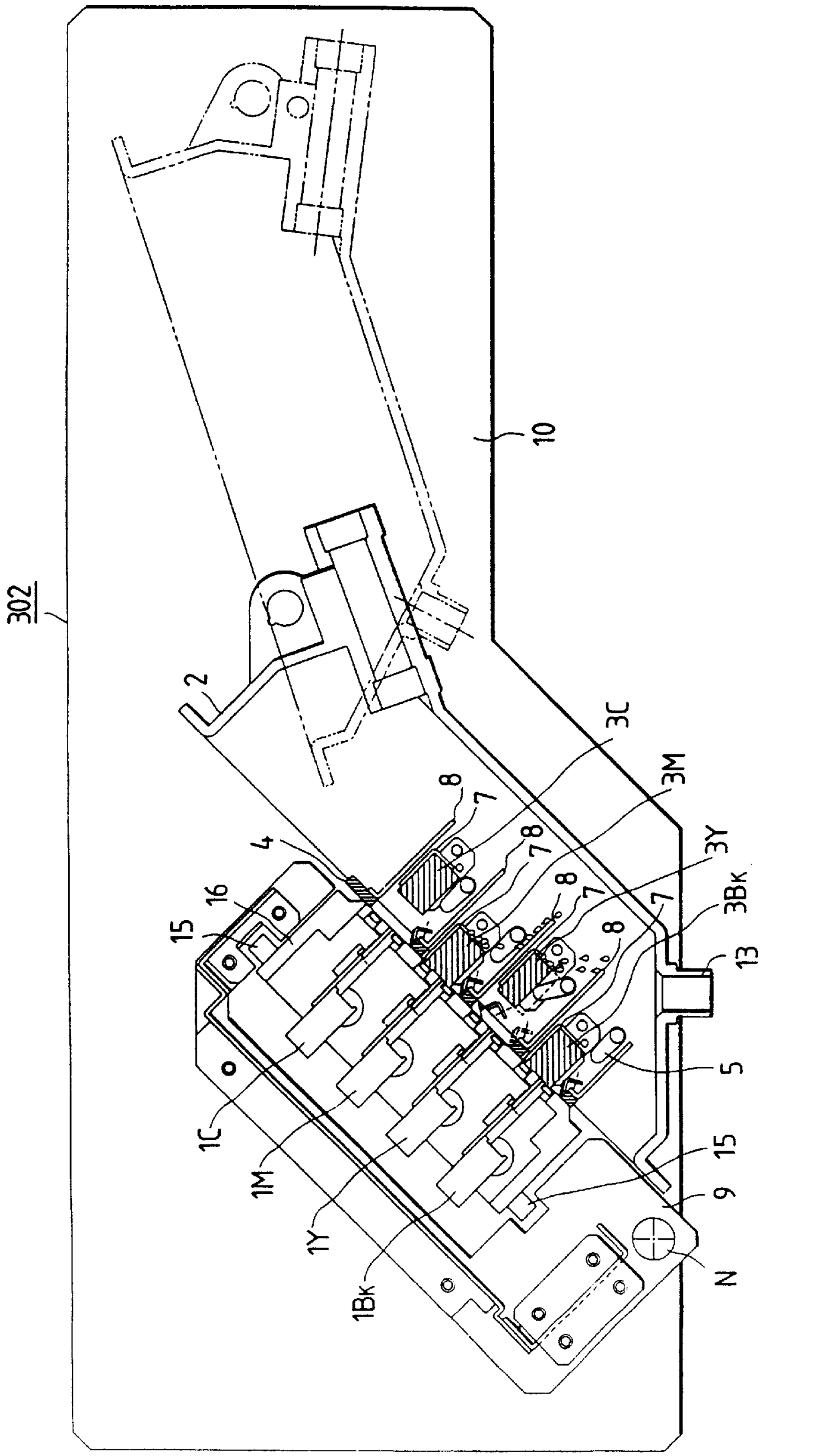
FIGS. 2A and 2B are partial cross-sectional views of a head recovery system shown in FIG. 2.
Figure 2B:
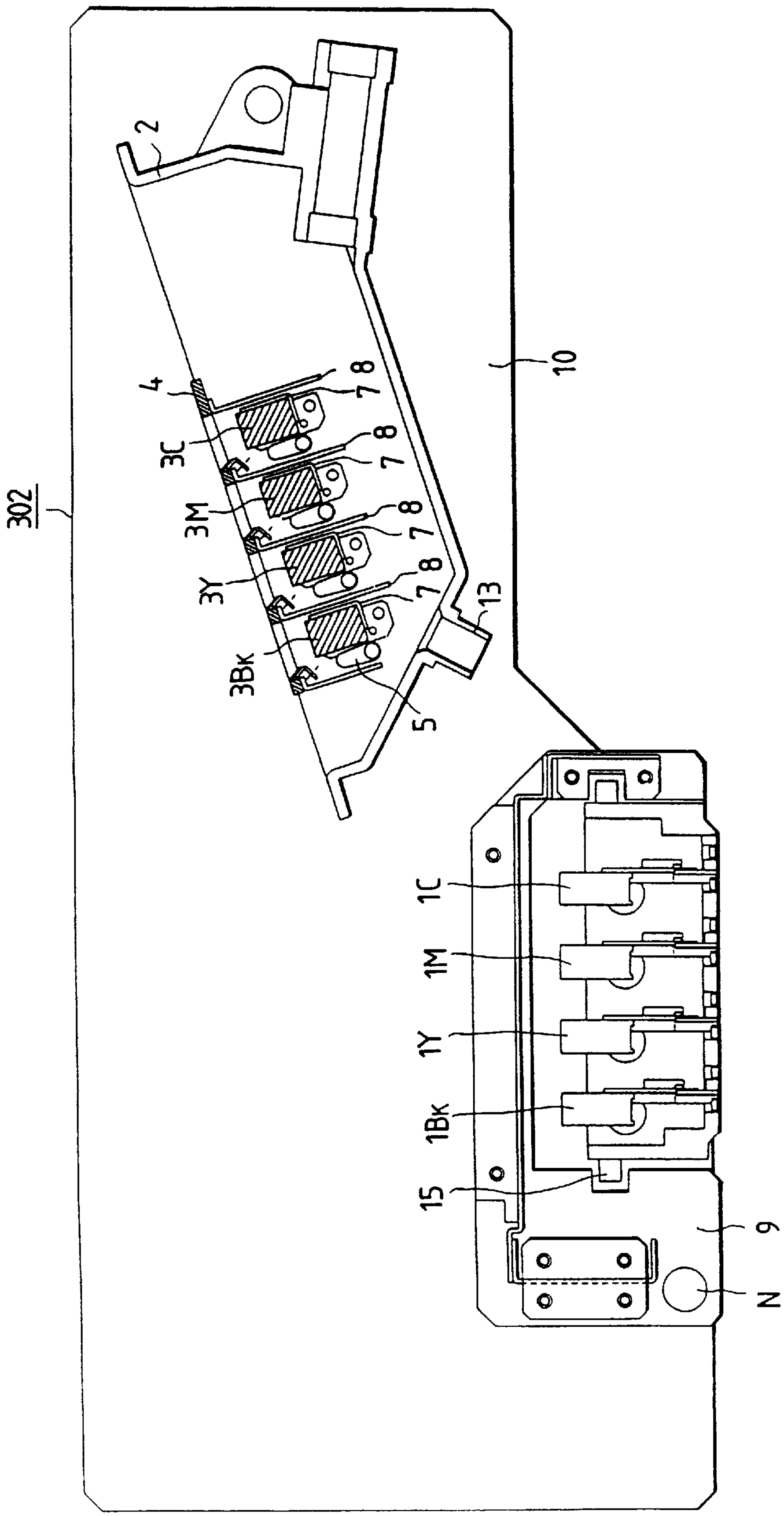

FIGS. 2A and 2B are partial cross-sectional views of the printer unit of an ink jet recording apparatus of the present invention. In the following there will be explained the state of the recording head in the recovery operation, with reference to FIG. 2A. Ink jet recording heads 1C, 1M, 1Y, 1Bk respectively receiving inks of cyan, magenta, yellow and black are precisely fixed in a head block 6, with a level of parallelism and a mutual distance with a desired precision. In the vicinity of discharge ports of said heads 1C, 1M, 1Y, 1Bk there are provided ink absorbing members 3C, 3M, 3Y, 3Bk, corresponding to the discharge ports of said recording heads. Said ink absorbing members 3C, 3M, 3Y, 3Bk are supported by a guide 7 so as to be engageable with and detachable from the discharge face of said recording heads. In FIG. 2A, the ink absorbing members 3C, 3Y are shown in a separate state from the discharge face of the recording heads 1C, 1Y, while the absorbing members 3M, 3Bk are shown in contact with the discharge face of the recording heads 1M, 1Bk. Between the neighboring ink absorbing members there is provided an ink partition 8. Between each partition 8 and the head block 6 there is provided an ink seal 4 for separating inks of different colors. In the vicinity of each ink absorbing member, there is provided an ink squeezing member 5 for squeezing each of the ink absorbing members 3C, 3M, 3Y, 3Bk to remove the ink absorbed therein, by means of an unrepresented lever. FIG. 2A shows a state that the ink absorbing member 3Y of the yellow recording head 1Y is squeezed.

The head block 6 on which the recording heads 1C, 1M, 1Y, 1Bk are fixed is detachably inserted into a block stay 9 by means of a rail 15. Said block stay is rotatable, together with the had block 6 and the recording heads of different colors, about a shaft N. A recovery reservoir 2 is rendered movable, by means of an unrepresented moving mechanism, from a state of recovery operation shown in FIG. 2A, to a retracted position shown by double-dotted chain line position. The recovery reservoir 2 is provided at the bottom thereof with an ink exhaust opening, whereby the ink discharged from the recording heads 1C, 1M, 1Y, 1Bk, then absorbed by the ink absorbing members, 3C, 3M, 3Y, 3Bk and recovered therefrom is guided to an unrepresented used ink tank, through an unrepresented ink hose.

FIG. 2B is a partial cross-sectional view showing the recording heads in the image recording state. After the recovery reservoir 2 is moved from the state in FIG. 2A to the retracted position shown by chain lines, the recording heads rotate to a horizontal position as shown in FIG. 2B. In this state the ink is discharged, in response to the image recording signal, from the recording heads, thereby forming an image on a recording sheet transported at a desired distance from the discharge face P of the recording heads.

The recording head most suitable for the present invention employs an electrothermal converting element as the energy generating means, prepared by semiconductor manufacturing process. Corresponding to each discharge port (orifice) there is provided a liquid path, and an electrothermal converting element is provided in each liquid path for applying thermal energy to the liquid in said liquid path thereby discharging said liquid from the corresponding discharge port and forming a flying droplet. The liquid is supplied to the liquid paths from a common liquid chamber.

Figure 17:
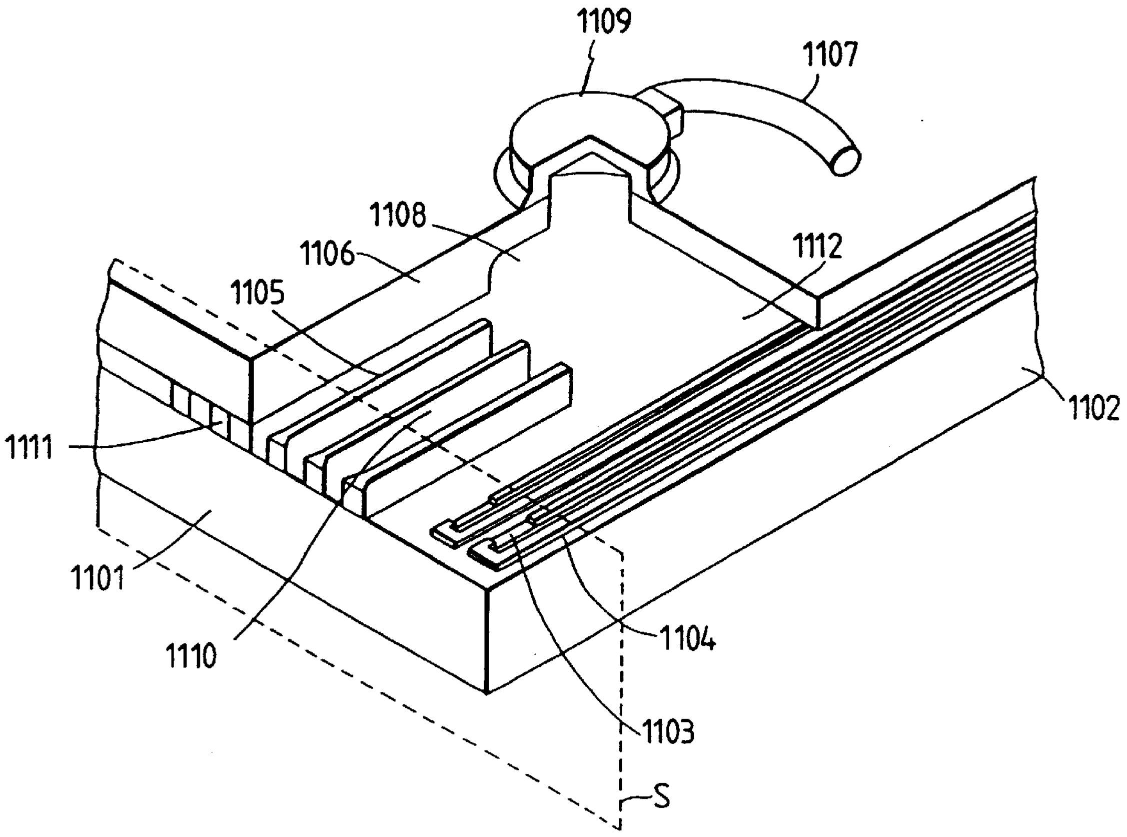
FIG. 17 is a schematic view of an ink jet recording head applicable in the present invention.

FIG. 17 schematically shows the structure of said ink jet recording head adapted for use in the present invention, prepared through semiconductor manufacturing steps such as etching, evaporation and sputtering and comprising a substrate 1102, electrothermal converting elements 1103 formed thereon, electrodes 1104, liquid path walls 1105, and a cover plate 1106. The recording liquid 1112 is supplied, from an unrepresented liquid reservoir to a common liquid chamber 1108 of the recording head 1101 through a liquid supply pipe 1107. A connector 1109 is provided for the liquid supply pipe. The liquid 1112 supplied into the common liquid chamber 1108 is supplied by capillary phenomenon into the liquid paths 1110 and is stably maintained therein by forming a meniscus at the plane of discharge port at the end of the liquid path. By energization of the electrothermal converting element 1103, the liquid present thereon is rapidly heated to generate a bubble, and the liquid is discharged, forming a droplet, from the discharge port 1111 by the expansion and contraction of the bubble. By forming the above-explained structure with a high density such as 16 nozzles/mm, there can be obtained a multi-nozzle ink jet recording head with 128 or 256 nozzles, or with a width corresponding to the entire recording width.

Figure 3A:
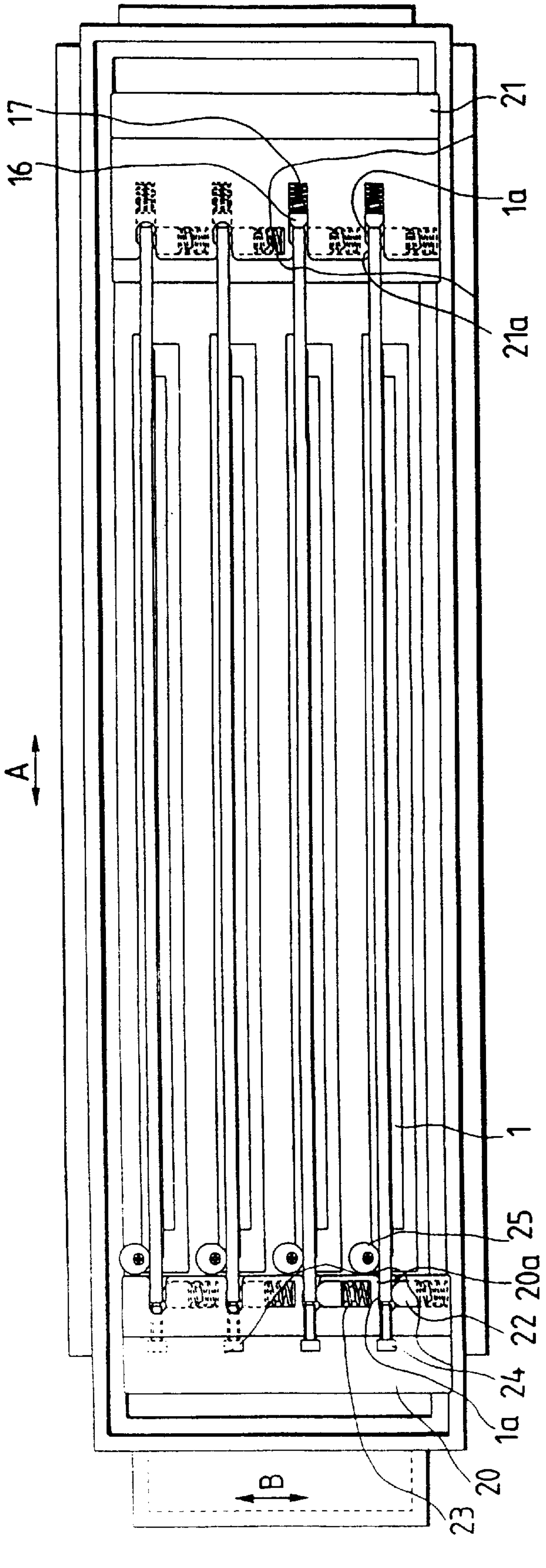
FIGS. 3A and 3B are schematic views of a fixed part for recording head positioning.
Figure 3B:
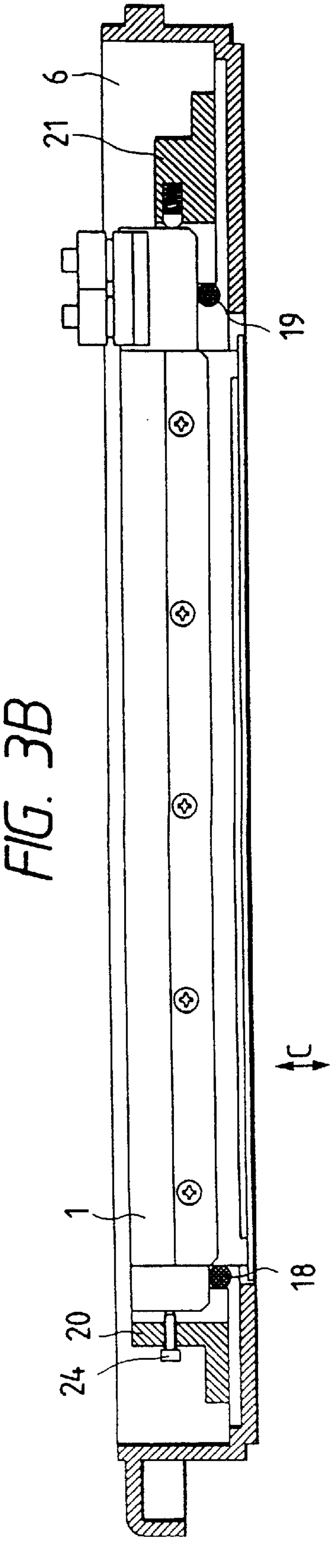

FIGS. 3A and 3B illustrate the recording heads and a positioning mechanism therefor, respectively in a schematic plan view and a schematic lateral view. Referring to FIG. 3A, engaging portions 1*a* at both ends of the head 1 are inserted into recesses of head fixing members 20, 21 whereby the head is fixed in directions A and B in FIG. 3A. Also the position in the vertical direction C in FIG. 3B is determined by positioning shafts 18, 19. Pressing pins 22 press the heads, inserted into the fixing members 20, 21 toward engaging portions 20*a,* 21*a* by means of springs 23, thereby defining the positions of said heads. An adjust screw 24 is used for adjusting the position of each head in a direction A, namely in a direction perpendicular to the direction of sheet advancement (hereinafter called "left margin"). Eccentric pins 25 are provided for adjusting the inclination of the heads. Rotation of each eccentric pin 25 shown in FIG. 3A displaces the engaging portion 1*a* of each head 1, thereby moving said head in the direction B.

The above-explained adjusting mechanism allows easy adjustment of the mounting position of each head. It is therefore possible to obtain an image of high quality, by correcting the aberration among images of different colors.

Figure 4A:
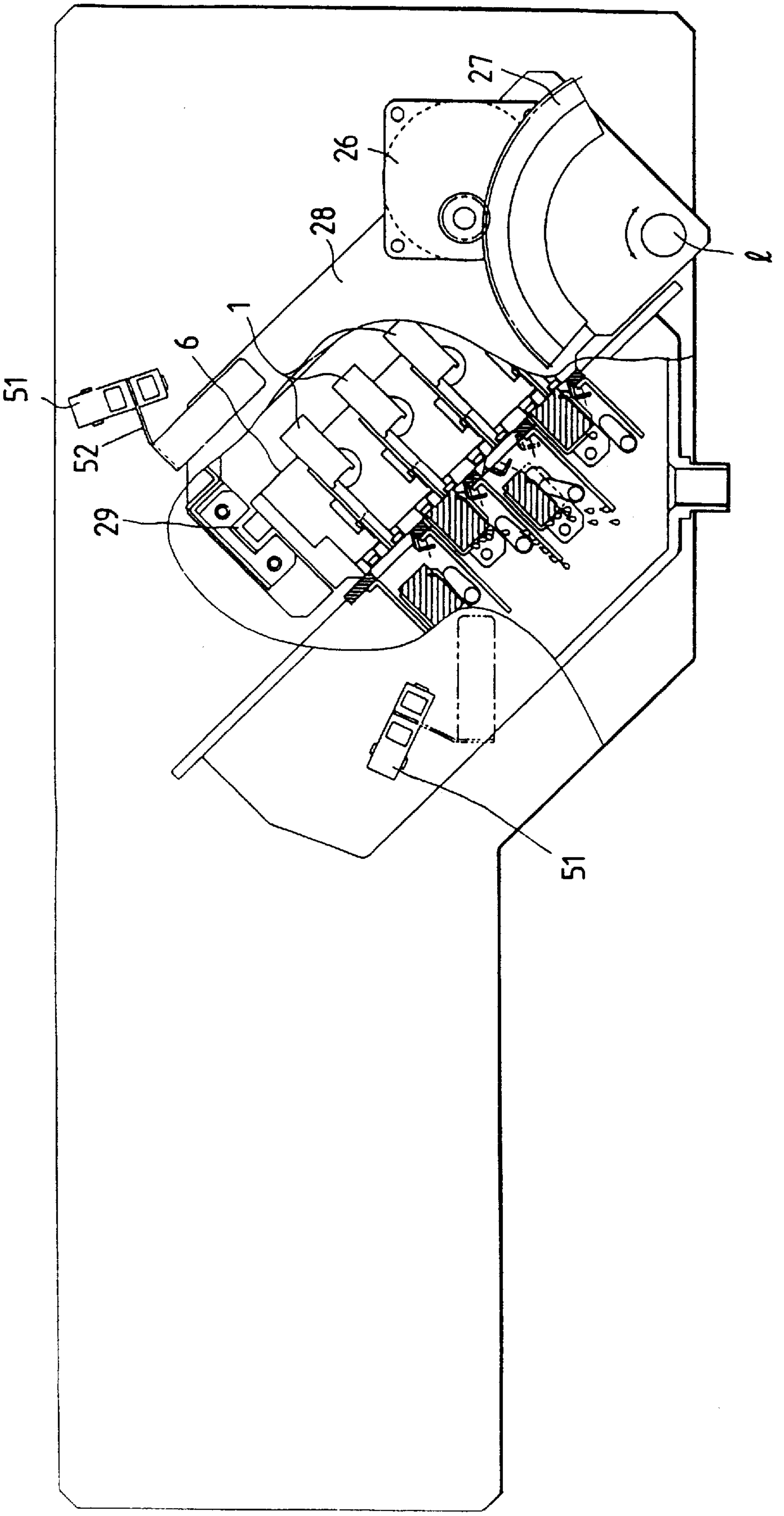
FIGS. 4A and 4B are schematic views of a drive unit for the recording head.
Figure 4B:
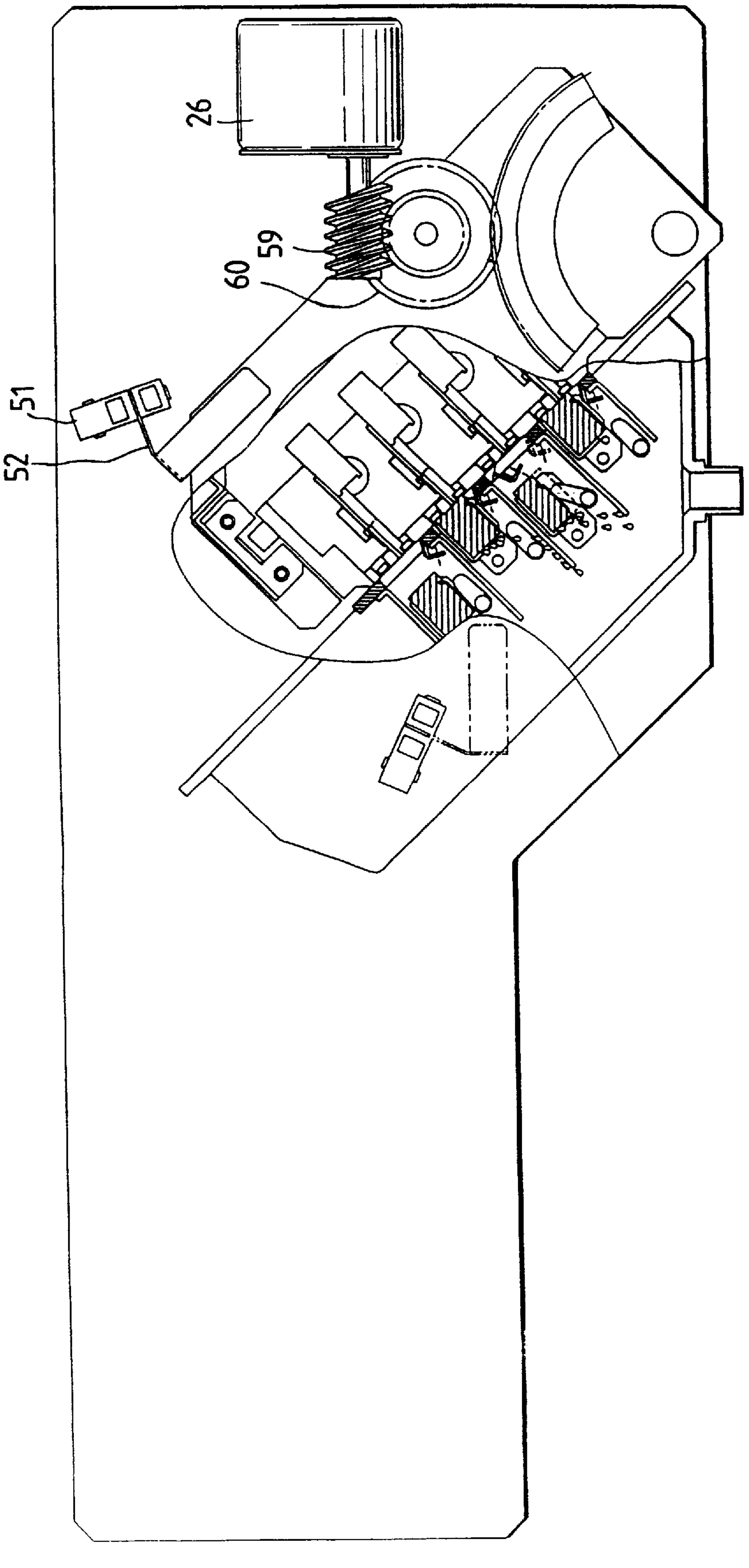

Now reference is made to FIGS. 4A and 4B for explaining the head moving mechanism. The rotation of a head unit drive motor 26 is transmitted through a gear 27 to a head frame 28, which is rotatable, as indicated by an arrow, about a rotation shaft 1. As will be understood from FIG. 1, the recording sheet is transported on a conveyor belt from upper left in FIG. 5. Since the gap between the recording heads and the conveyor belt is as small as 0.3 to 2.0 mm, sheet jamming tends to occur relatively frequently in said gap. For this reason, the rotating center of the above-explained head moving mechanism is positioned at the downstream side of the transporting direction of the recording sheet. Thus, when the heads are moved by rotation, the discharge ports are present at the left side of the drawing, or at the upstream side. Consequently, even if a sheet jamming occurs in this part, there can be prevented the damage on the discharge face of the head or ink dragging thereon by the jammed sheet.

Also in the ink jet recording apparatus, a fixing unit is usually provided at the downstream side of the heads. Therefore, the discharge ports positioned at the upstream side of the present embodiment minimizes the influence of hot air or high temperature generated by said fixing unit, thereby enabling to protect the discharge face of the recording heads and prevent drying or failed discharge of the ink. The head frame 28 is provided with a rail 29 whereby the head block 6 on which the heads 1 are mounted can be integrally removed and replaced. The removal or insertion of the head block 6 is conducted in a state where the head frame 28 matches a cut-off portion (not shown) formed in a front plate. The head from 28 can be stopped at (i) a recovery position, (ii) print position, (iii) a retracted position, or (iv) a head unit replacement position. FIGS. 4A and 4B show the (i) recovery position. The retracted position (iii) corresponds to the retracted position of the recording head 305 shown in FIGS. 12A and 12B for moving the recovery reservoir 2. The print position (ii) corresponds to a head down position shown in FIG. 12D. In the present embodiment, said retracted position (iii) is same as the head unit replacement position (iv). These positions can be detected exactly by a light shield plate 52 provided on the head frame 28, serving to cover detecting areas of sensors 51 provided corresponding to said stop positions.

FIG. 4B shows a structure employing a worm reducer for moving the head moving mechanism. There are provided a worm gear 59 and a worm wheel 60. Because of the characteristics of such worm reducer, the head frame 28 can only be moved by the motor, whereby it can be prevented from spontaneous falling due to the weight of plural heads mounted on the head frame and can be maintained fixed when the motor is deactivated.

Figure 5A:
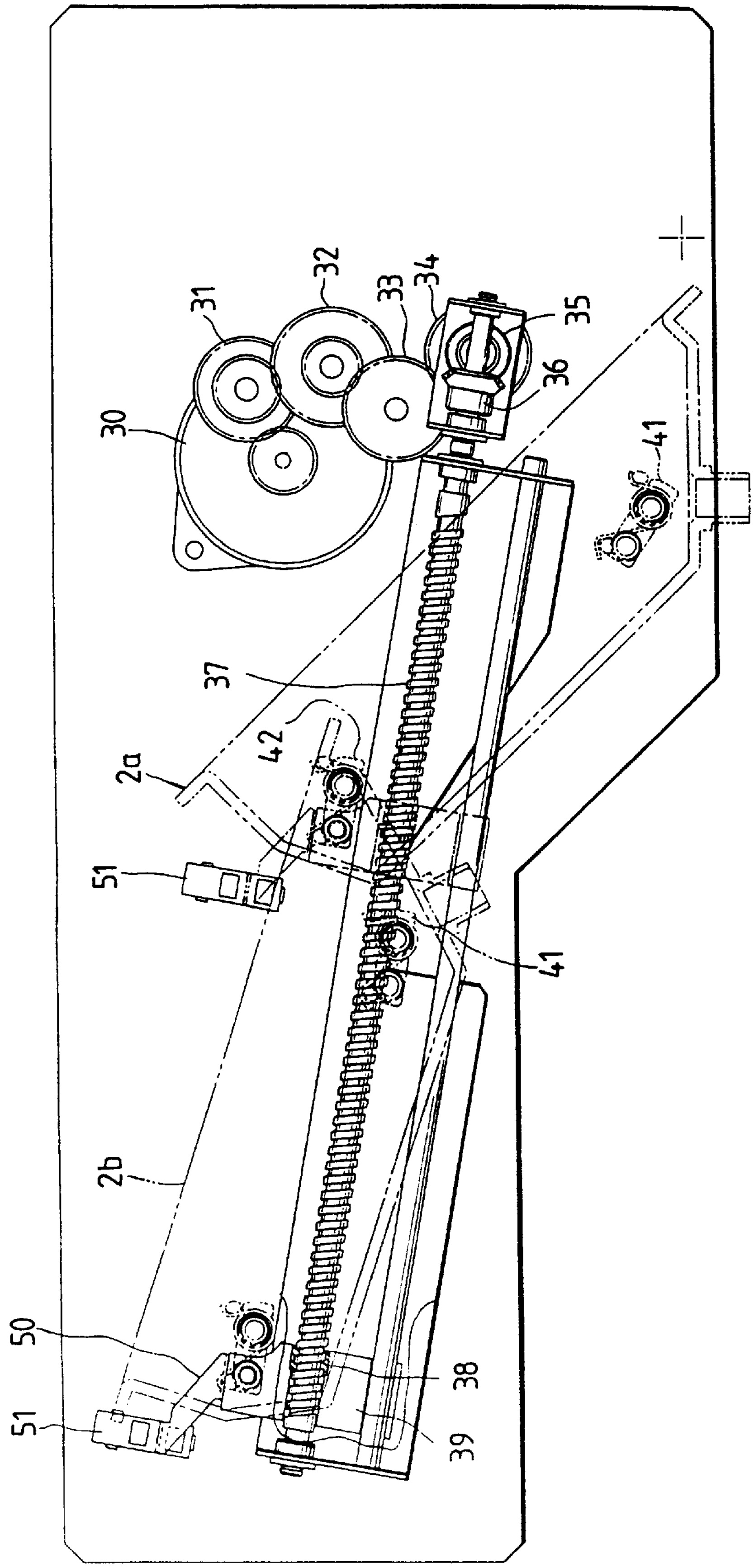
FIGS. 5A, 5B and 5C are schematic views of a driving unit for the recovery system.
Figure 5B:
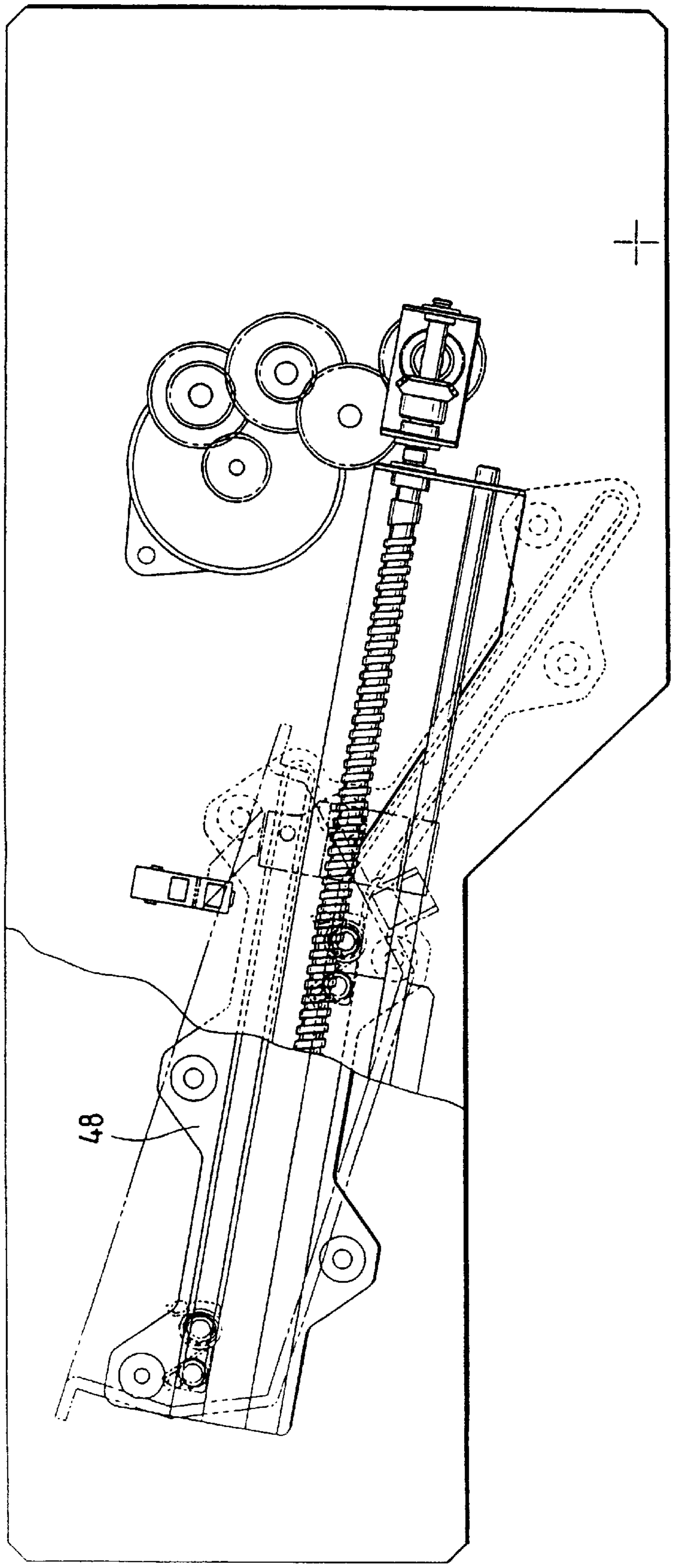
Figure 5C:
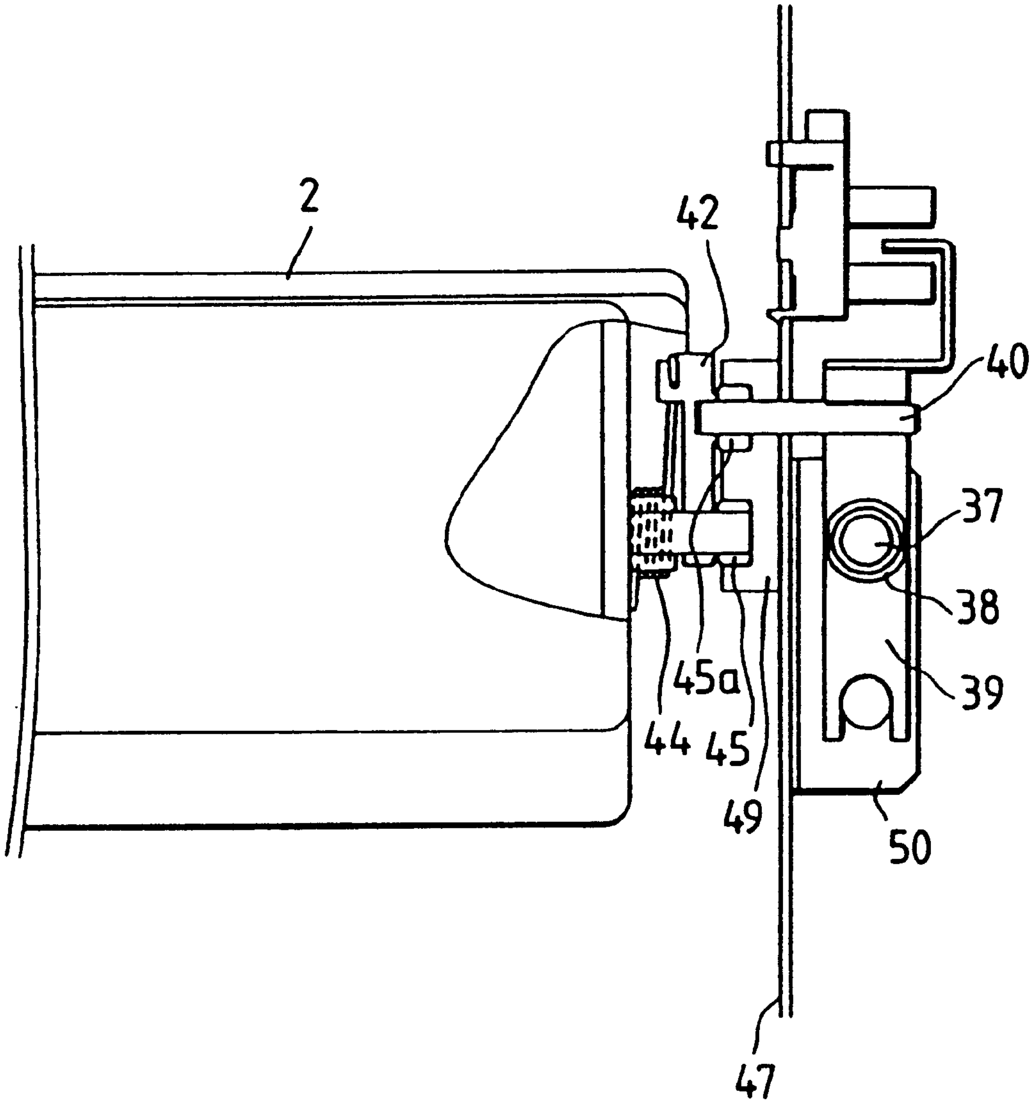

FIGS. 5A and 5B are partial lateral views of a drive mechanism for the head recovery unit, seen from the same side as in FIGS. 4A and 4B. FIG. 5C is a partial magnified view, seen from the rear side, of a left-hand portion of the drive mechanism shown in FIG. 5A.

The rotation of a recovery unit drive motor 30 is transmitted, through gears 31–36, to a driving screw 37, which converts the power of the motor 30 into a linear movement of a screw nut 38, thereby moving the recovery reservoir 2 from the recovery (capping) position to the retracted position. A nut holder 39 engaging with the screw nut 38 is linked by a link pin with the recovery reservoir 2 thereby enabling the reciprocating movement thereof by the rotation of the motor 30. On the front and rear faces of the recovery reservoir 2, there are respectively provided two arms 41, 42 (those on the rear side not shown) in rotatable manner. On the arm 42 there is rotatably supported a roller 45, and a roller 45*a* is provided on a lateral plate 47 of the unit opposite to the arm 42 of the recovery reservoir 2. Rollers similar to 45, 45*a* are provided also on the arm 41. Rails 48, 49 with grooves for engaging with the recovery reservoir 2 at the reciprocating motion thereof are provided on both sides thereof. Torsion coil springs 44 are provided on the arms 41, 42 so as to bias the rollers toward the grooves of said rails. The rotation of the motor 30 is transmitted, through the gears 31–36, screw 37, nut 38, nut holder 39 and link pin 40, to the arms 41, 42 and is converted into the reciprocating motion of the recovery reservoir 2. Said motion is achieved along said grooves without play, because the rollers 45, 45*a* rotatably supported on the arms 41, 42 are biased by the torsion coil springs 44 toward said grooves of the rails 48, 49. Consequently the reservoir 2 can be moved along a desired trajectory formed by the rails 48, 49. Presence of plural rollers in an arm disperses the load of the reservoir 2, thereby enabling smooth movement thereof. Also presence of arms and rollers on both sides of the reservoir 2 achieves smooth transmission of the driving force by a single screw for moving the reservoir 2. The recovery reservoir 2 is stopped either at the recovery position 2*a* or at the retracted position 2*b,* which are precisely defined by the engagement of a light shield plate 50, mounted on the nut holder 39, with the detecting portion of a sensor (photointerruptor) provided at each stopping position.

Figure 6A:
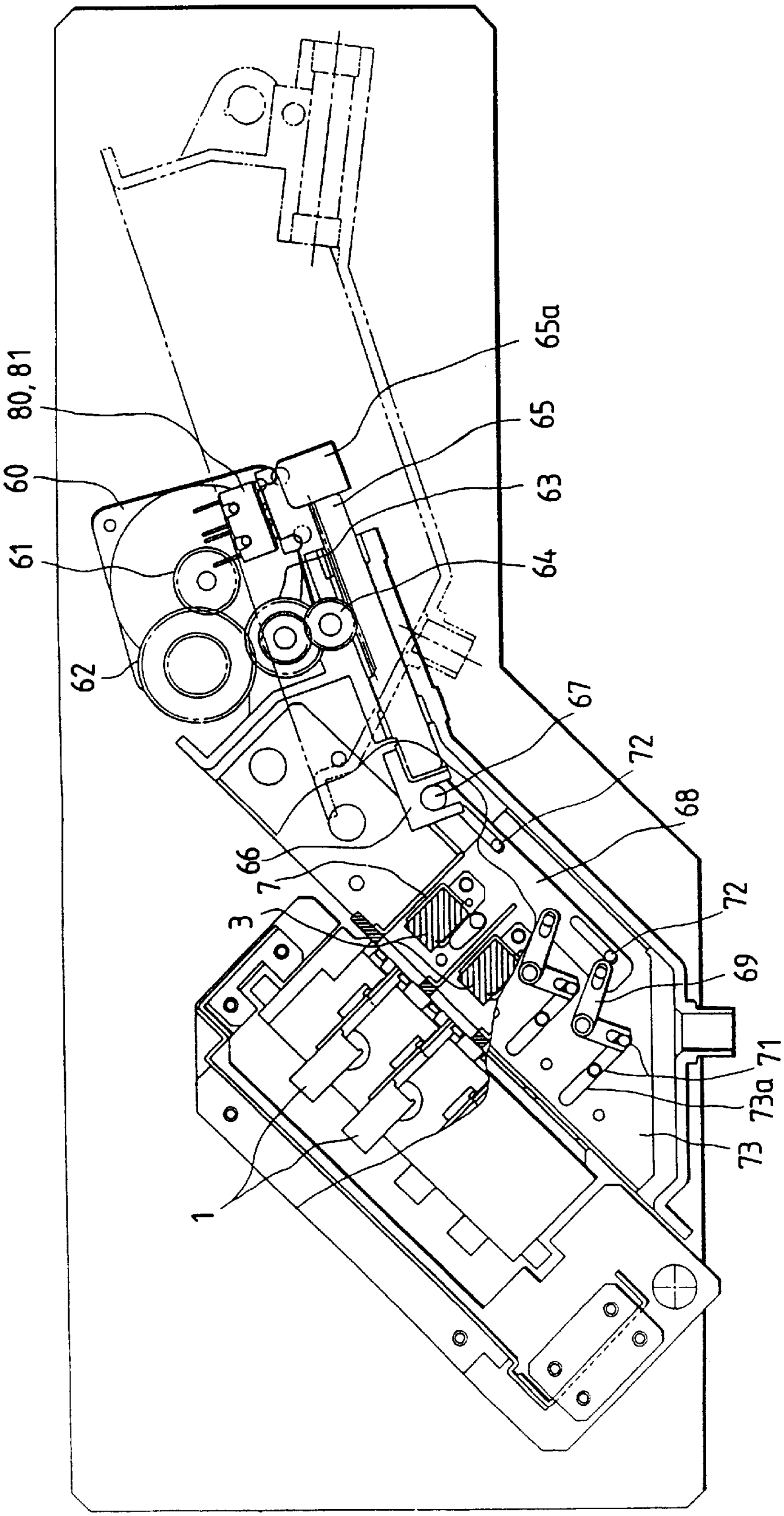
FIGS. 6A and 6B are schematic views of a driving unit for a cap for the recovery system.
Figure 6B:
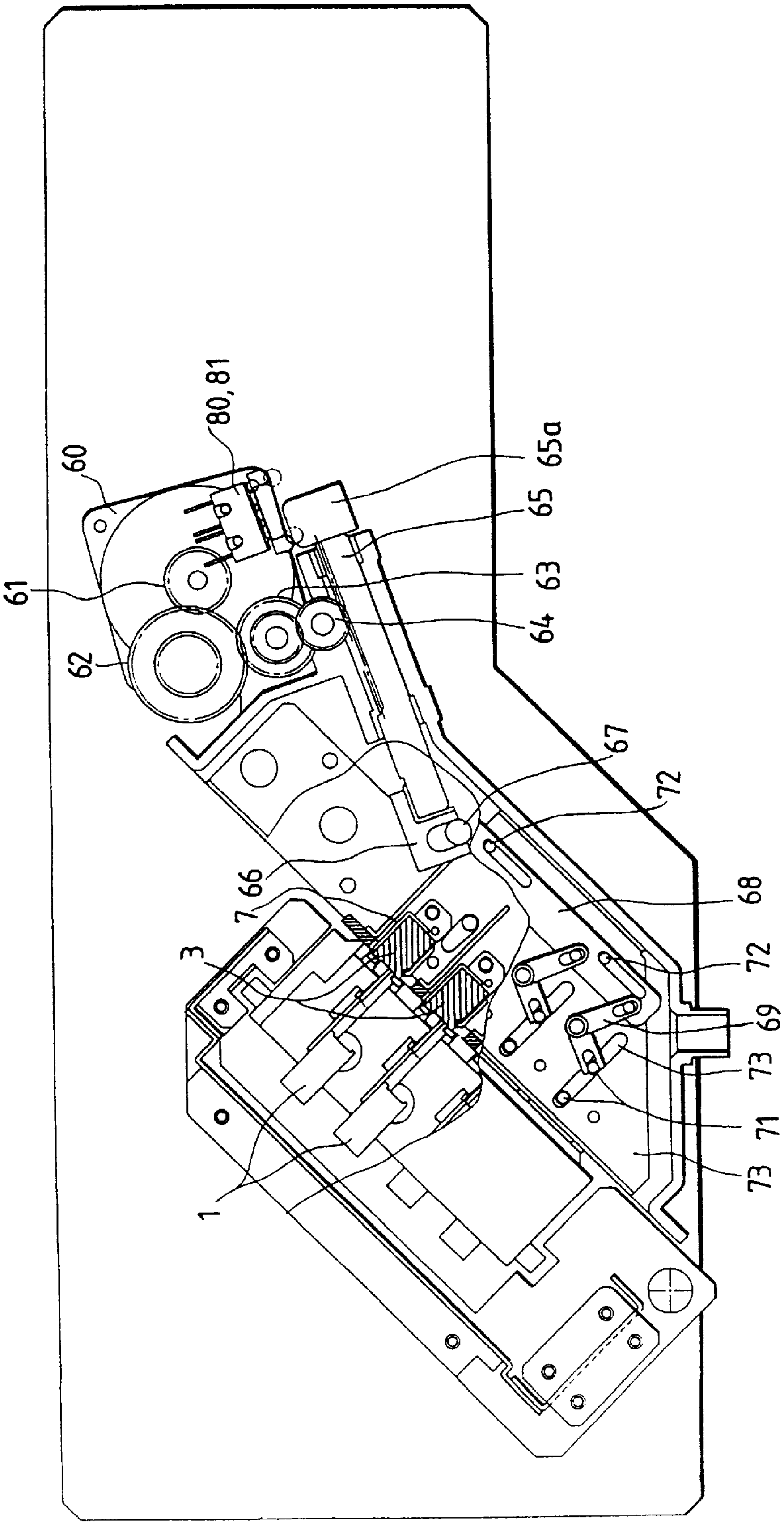

In the following there will be explained the recovery mechanism for capping, idle discharge and ink pressurized circulation, with reference to FIGS. 6A and 6B showing the cap driving unit of the recovery unit of the present invention, respectively in a state where the absorbing member is separated from or attached to the discharge face of the recording head. The rotation of a cap driving motor 60 is transmitted through gears 61–64 to a rack 65, and, further through members 66, 67, to a cap driving slide arm 68 slidable along slide pins 72. The reciprocating motion of said slide arm 68 is converted, by arms 69, into a vertical movement of the absorbing member guide 7. Each ink absorbing member guided by said guide 7 is pinched by a stopper and is rendered vertically movable by the engagement of slide pins 71 with guide grooves 73*a* formed in a lateral plate 73. Thus the rotation of the motor 60 is transmitted for contacting or separating motion of the ink absorbing member 3 to or from the discharge face of the heads 1. Said contacted or separated positions are detected by microswitches 80, 81 mounted on the reservoir 2, engaging with a detection member 65*a* mounted on the rack 65.

Figure 7A:
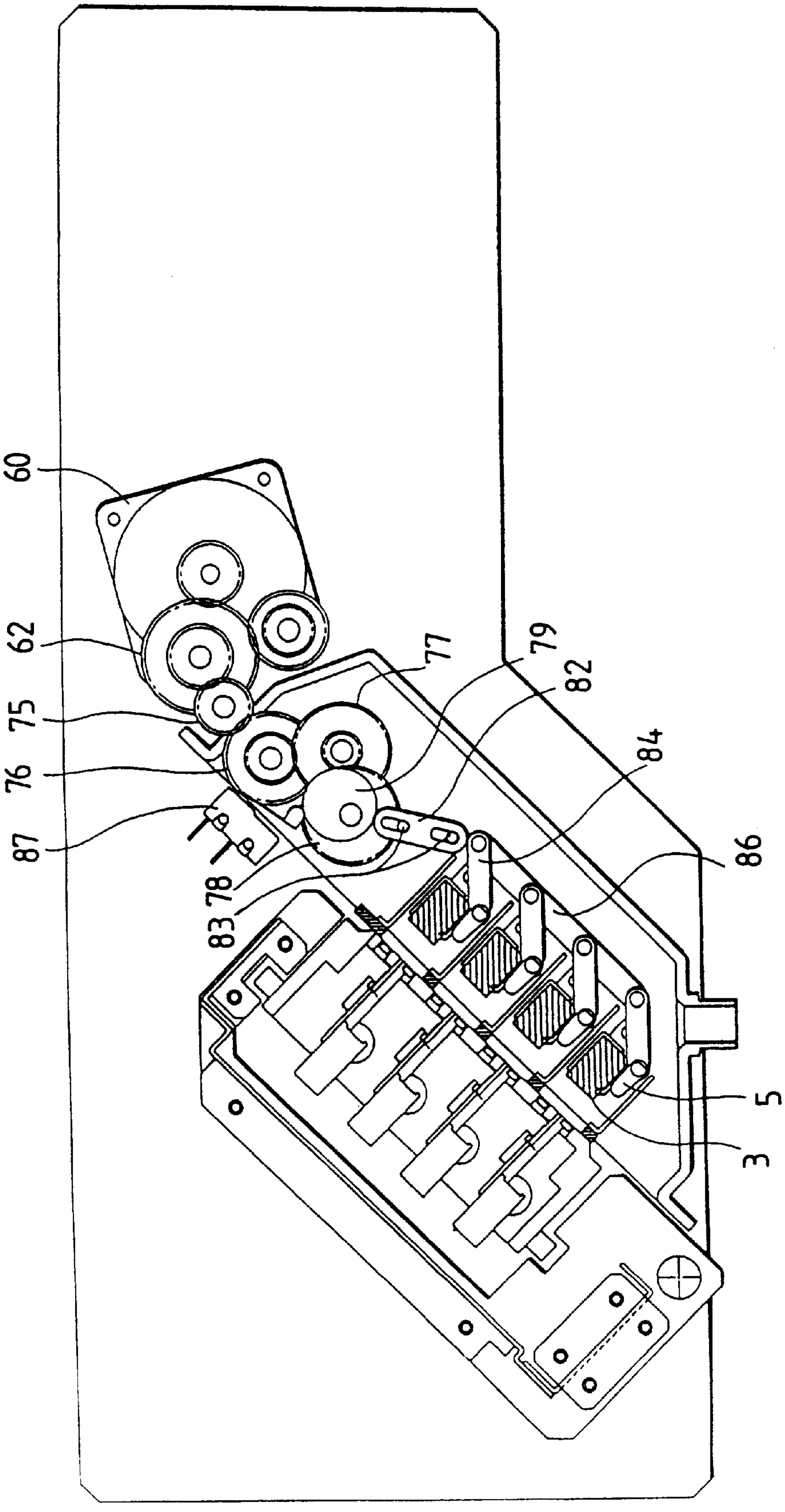
FIGS. 7A and 7B are views of a squeezing unit for an ink absorbing member of the recovery system.
Figure 7B:
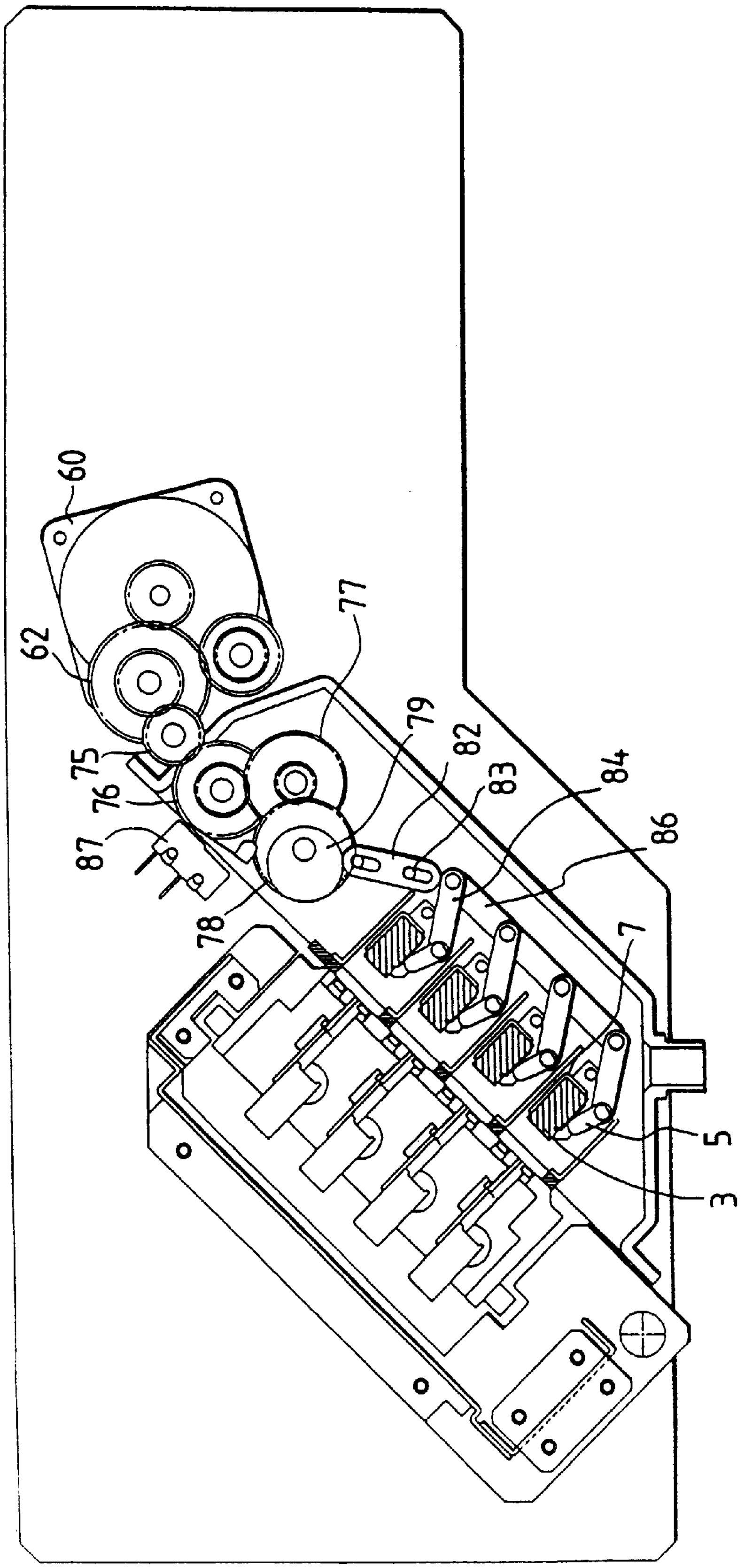

In the following there will be explained a preferred embodiment of the squeezing mechanism for the ink absorbing members of the recovery unit of the present invention, with reference to FIGS. 7A and 7B, respectively showing a stand-by state and a squeezing state. In the present embodiment, the aforementioned cap driving motor 60 is used as a squeezing motor. The capping mechanism and the squeezing mechanism are selectively driven by a solenoid clutch (not shown). The rotation transmitted by said clutch is transmitted, through gears 75–78, to a squeezing cam 79, generating a reciprocating motion of a slide arm 82. The movement of said slide arm 82, rendered linearly moveable by means of slide pins 83 provided on the lateral plate, is transmitted through layers 84 to squeezing members 5 for the ink absorbing members, thereby pressing said absorbing members toward the guides 7 and removing the ink absorbed therein (FIG. 7B). The squeezing members for different colors are mutually linked by a link bar 86 to enable simultaneous squeezing motion for all the colors.

In the present embodiment, the squeezing mechanism is activated when the ink absorbing members 3 are separated from the discharge faces of the recording heads, and the position of the squeezing mechanism is detected by a microswitch 87 engaging with and detecting the rotation of the cam 79. Ordinarily, a unit operation of squeezing consists of a revolution of the cam. The ink absorbing members 3 of which absorbing power is refreshed by said squeezing operation are again brought into discharge face of the heads, thereby achieving complete cleaning.

Figure 8A:
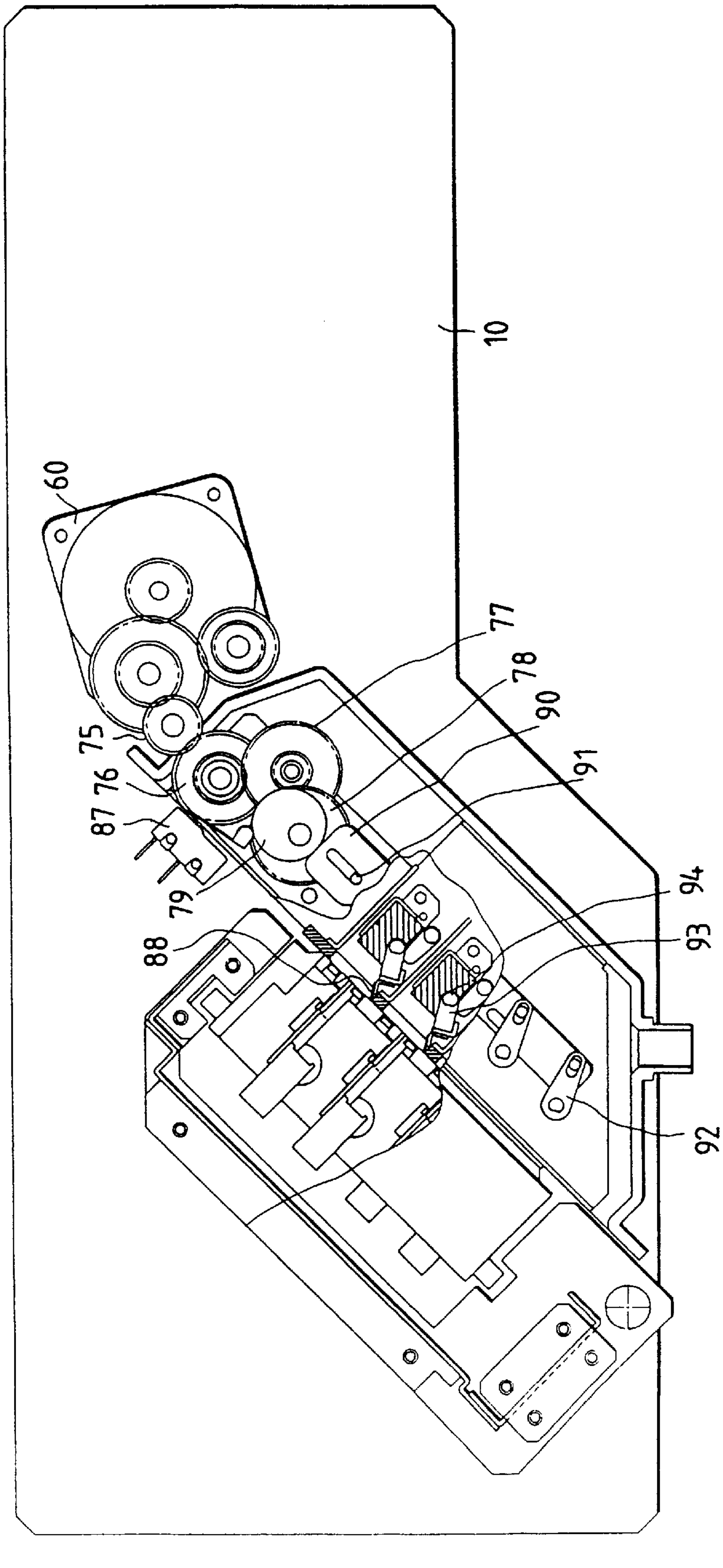
FIGS. 8A and 8B are views of a wiping unit for a discharge face of the recording head.
Figure 8B:
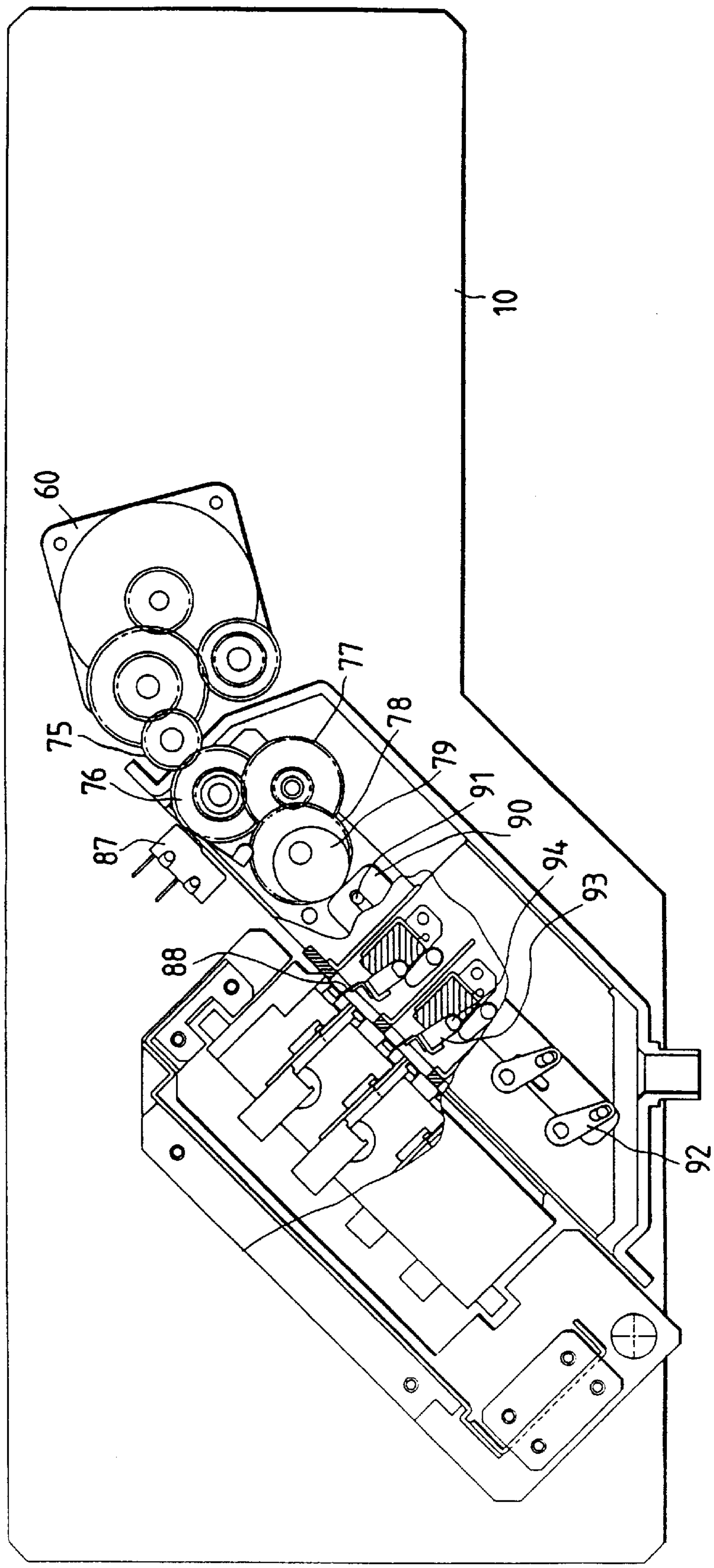

In the following there will be explained a wiping mechanism for the discharge faces of the recording heads, with reference to FIGS. 8A and 8B respectively showing a stand-by state and a driven state of said mechanism. In the present embodiment, there are employed cleaning blades 88 for wiping the discharge faces of the recording heads. The aforementioned squeezing motor 60 is used for driving said blades, and the wiping mechanism is not switched alone since the wiping operation is linked in sequence with the squeezing operation. The rotation of the motor 60 transmitted to the cam 79 through the gears 75–78 as explained above is transmitted to a blade driving slide arm 90. The movement of said arm 90, which is linearly movable by a slide pin 91 fixed on the lateral plate, is further transmitted to blade rotating arms 92, thereby rotating blades 88 mounted on blade support members 93, about shafts 94. Said shafts are naturally so positioned as to efficiently wipe off the dusts and ink deposited or adhered on the discharge faces of the recording heads. In the present embodiment, as explained above, the wiping mechanism is driven by the source for the squeezing mechanism, and is so constructed as to drive the blades in a state where the ink absorbing members are separated from the discharge faces of the recording heads. The blade driving is also detected, as in the squeezing operation, by the microswitch 87 engaging with the cam 79. Thus the squeezing of the ink absorbing members and the driving with blades are simultaneously conducted by the motor 60 while the ink absorbing members 3 are separated from the discharge faces of the recording heads.

In the following there will be given a more detailed explanation on the recovery operation by the recovery system.

For the purpose of clarity, the recovery operation will be divided into (A) capping, (B) idle discharge and (C) ink disposal, in the following description.

Figure 9:
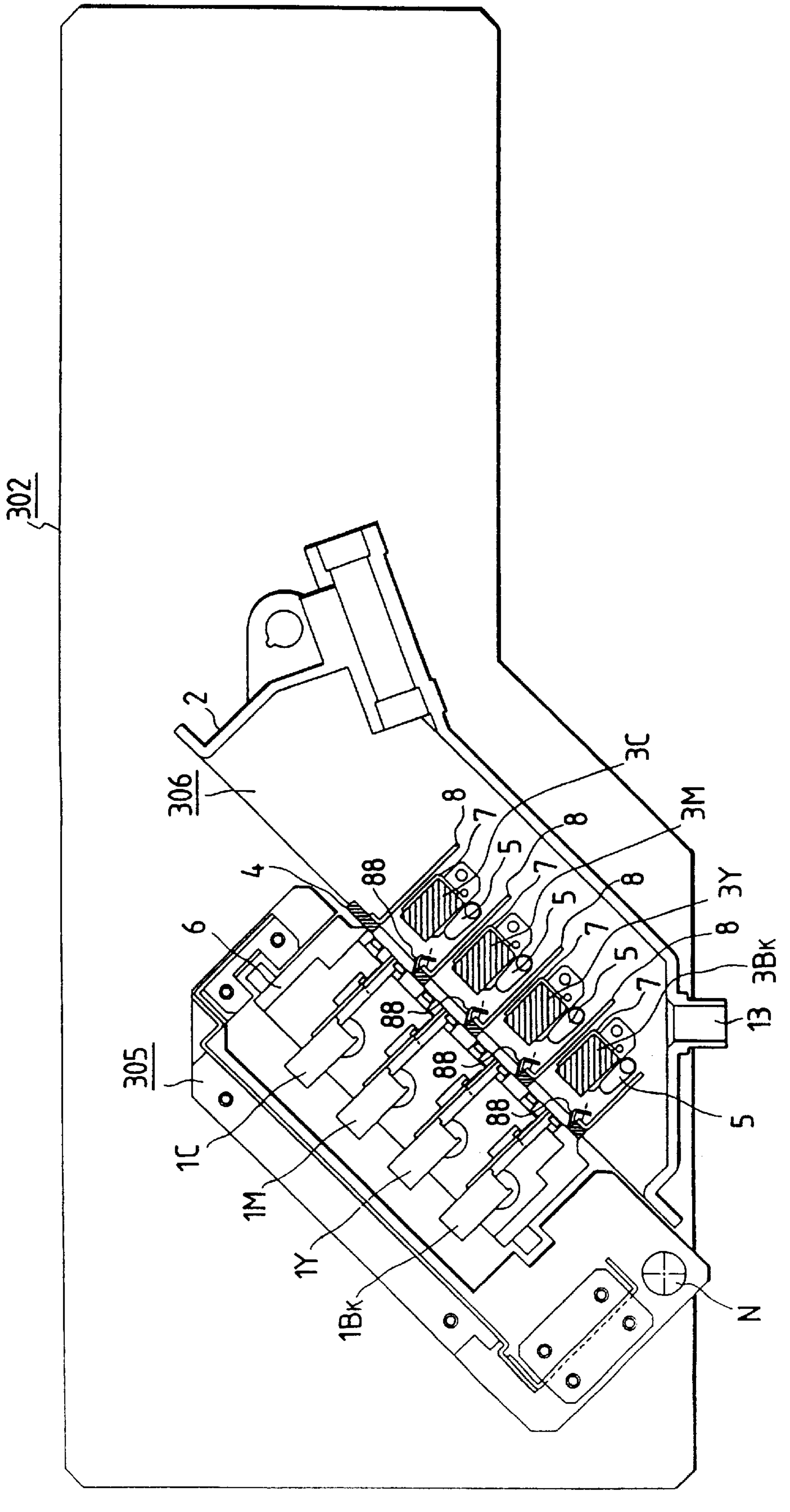
FIG. 9 is a cross-sectional view of a capped state of the recording head shown in FIG. 2.

At first there will be explained the capping operation (A) with reference to FIG. 9 showing the capped state of the recording head. The recording heads 1C, 1M, 1Y, 1Bk arranged in parallel manner in the head block 6 engage with the recovery capping unit 306. The recovery reservoir 2 is provided with the ink seals 4, partitions 8, and ink absorbing members 3C, 3M, 3Y, 3Bk which are normally spaced by a predetermined gap from the discharge faces of the heads, whereby the vicinity of the discharge ports of said recording heads is surrounded by the ink seals 4, partitions 8 and ink absorbing members 3C, 3M, 3Y, 3Bk to maintain suitable moisture and to prevent the discharge ports from drying. As explained above, the capping prevents the generation of failed ink discharge during the pause between the recording operations or during the stand-by state, and protects the discharge ports from the adhesion or deposition of dusts to the vicinity of the discharge ports.

Figure 10:
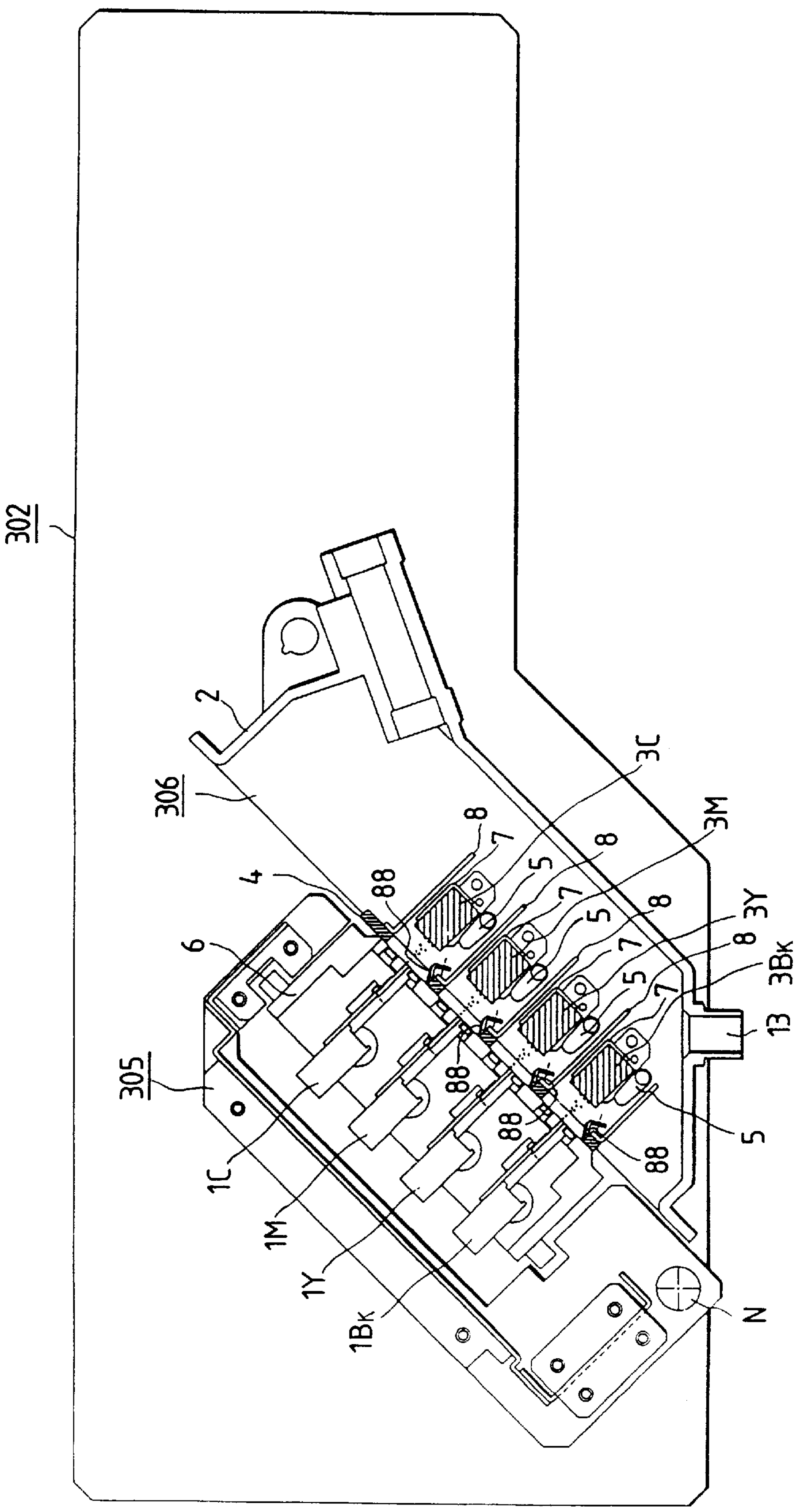
FIG. 10 is a cross-sectional view of an idle discharge operation of the recording head shown in FIG. 2.

In the following there will be explained the idle discharge operation (B) with reference to FIG. 10. The ink absorbing members 3C, 3M, 3Y, 3Bk are maintained at the predetermined gap from the discharge faces of the recording heads as in the capping operation explained above, and the energy generating means of all the recording heads 1C, 1M, 1Y, 1Bk are given an arbitrary number of ink discharge pulses. In this manner it is rendered possible to prevent failed discharge from the drying of ink, or defective discharge resulting from viscosified ink in all the discharge ports and deterioration in the printed image. The idle discharge is usually conducted when a copying instruction is given.

Figure 11C:
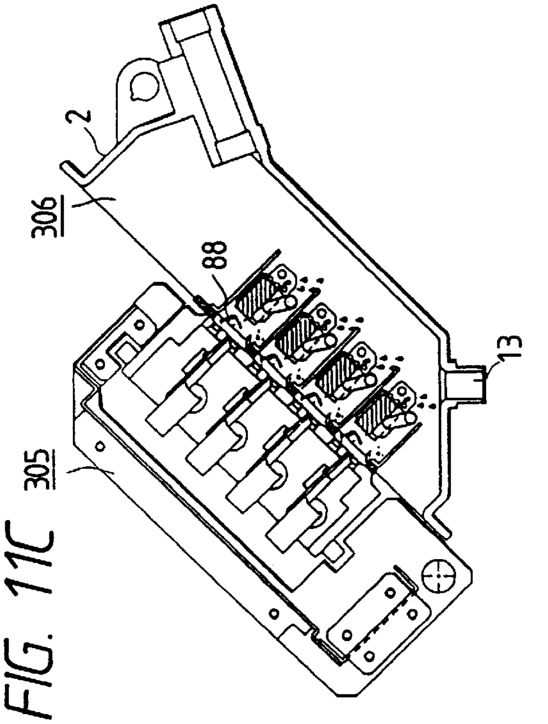
FIGS. 11A to 11D are views showing states of an ink pressure circulating operation.
Figure 11D:
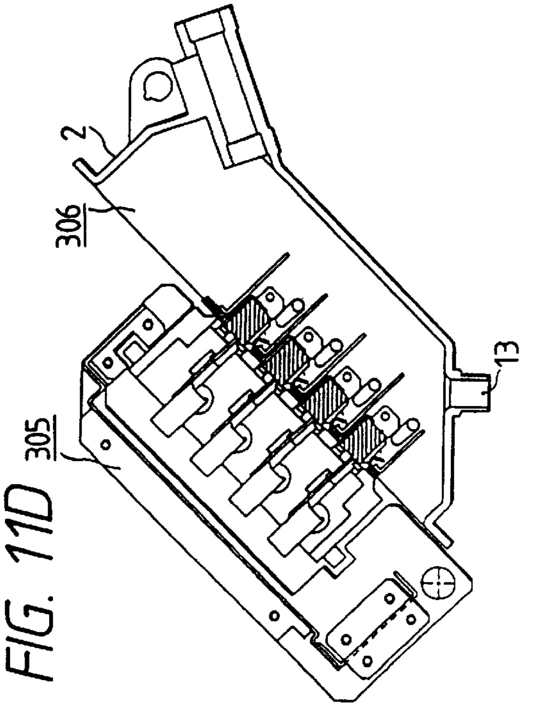

In the following there will be explained the ink exhaust operation with reference to FIGS. 11A to 11D, showing the function of the capping unit 306 in the pressurized ink circulation in the ink supply system for ink exhausting. The function of the capping unit 306 consists of four cycles, namely a normal capping (FIG. 11A), a pressurized ink circulation (FIG. 11B), squeezing of ink absorbing members and wiping (FIG. 11C), and engagement of ink absorbing members (FIG. 11D).

Said capping cycle is same as the aforementioned capping (A) in the normal stand-by or pause state. If the pressurized ink circulation mode is selected in this state by a command from the host computer or an instruction from the operator, there is assumed a state shown in FIG. 11B, in which the ink absorbing members 3C, 3M, 3Y, 3Bk maintained at a certain gap from the recording heads are brought into contact therewith. In this state, unrepresented ink supply pumps of the recording heads 1C, 1M, 1Y, 1Bk are activated to elevate the ink supply pressure forcedly. Thus the ink circulates in the ink supply system through the recording head to eliminate the bubbles therefrom , and to discharge the pressurized ink from the discharge ports. The dusts adhered to the discharge face are eliminated together with the discharged ink, whereby the vicinity of the discharge ports is cleaned. The ink discharged from the discharge ports is absorbed, without leaking, by the ink absorbing member 3 maintained in contact with the discharge face, and the ink exceeding the maximum capacity of said member drops by gravity into the recovery reservoir 2 through said absorbing member, and is guided to the used ink tank (not shown) through the ink exhaust outlet 13 and the used ink hose 12. The period of such pressurized circulation, or of the energizing time of the supply pump, is preferably in the order of 0.5 to several seconds in consideration of the efficiency of elimination of solidified ink or of bubbles.

Now there will be explained the squeezing of the absorbing member and the wiping shown in FIG. 11C. After the pressurized circulation shown in FIG. 11B, the ink absorbing member 3 is again separated from the discharge face of the recording head, and, in this state, the ink absorbing member in almost saturated state is squeezed with the squeezing member 5. The squeezed ink drops by gravity into the recovery reservoir 2 through the guide 7 and the partitions 8, and is guided to the used ink tank through the ink exhaust outlet 13 and the used ink hose 12. Simultaneous with the separation of the ink absorbing member 3 from the discharge face of the recording head and the squeezing of said member, the wiping blade 88 is activated to wipe off the ink, dusts and other deposited substances remaining on said discharge face. The wiped ink etc. drops onto the ink absorbing member 3, and, due to the simultaneous squeezing operation, further drops into the recovery reservoir 2 and into the used ink tank together with the squeezed ink. Thus, simultaneous with the separation of the ink absorbing member 3 from the discharge face, the substances remaining on said face are removed by the blade 88 and are eliminated together with the excessive ink squeezed from the ink absorbing member.

These squeezing and wiping operations are illustrated in FIG. 11C. By the squeezing with the squeezing member 5, the ink absorbing member 3 recovers the absorbing ability for the next absorbing operation. The absorbing member 3 is advantageously composed for example of sponge of PVF resin of a high absorbing ability, preferably capable of withstanding repeated use. In the present embodiment there is employed, for example, a material known under a trade name Bel-Ita supplied by Kanebo. After said squeezing of ink, the absorbing member is again brought into contact with the discharge face of the head, as shown in FIG. 11D. This cycle intends to completely clean the discharge face, by absorbing the ink, left in the cycle (B) due to the almost saturated state of the absorbing member, by the absorbing member of which absorbing ability is refreshed by squeezing.

Figure 11A:
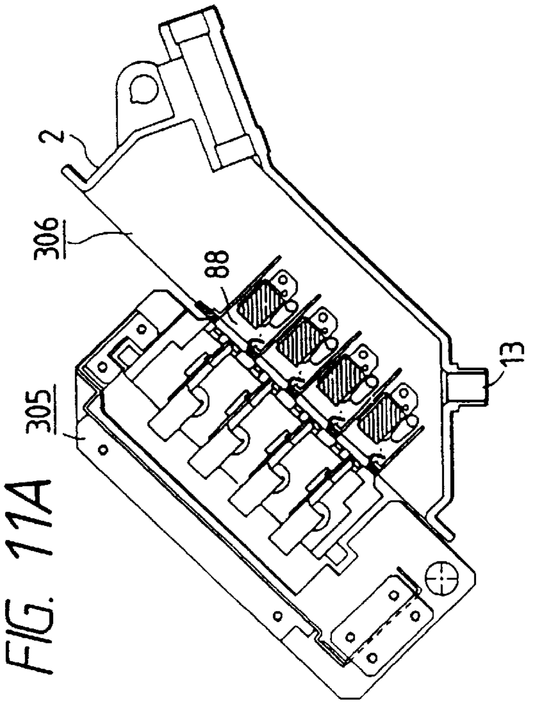
Figure 11B:
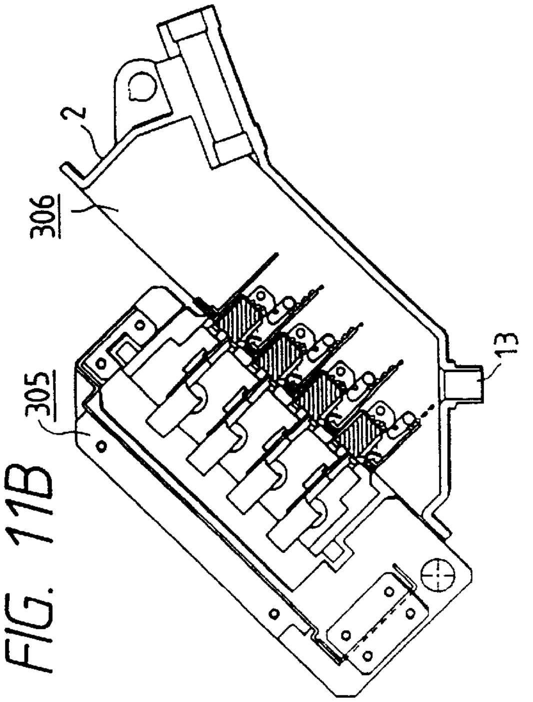

After the cycles shown in FIGS. 11A to 11D, the capped stand-by state shown in FIG. 11A is again assumed to maintain the cleaned head in satisfactory condition. Such pressurized circulating operation is usually conducted at the start of power supply in the apparatus or after a prolonged pause.

The above-explained capping, idle discharge and pressurized ink circulation serve to prevent the deterioration of the recorded image resulting from defective ink discharge at the image formation.

Figures 12A, 12B, 12C, 12D, 12E, 12F:
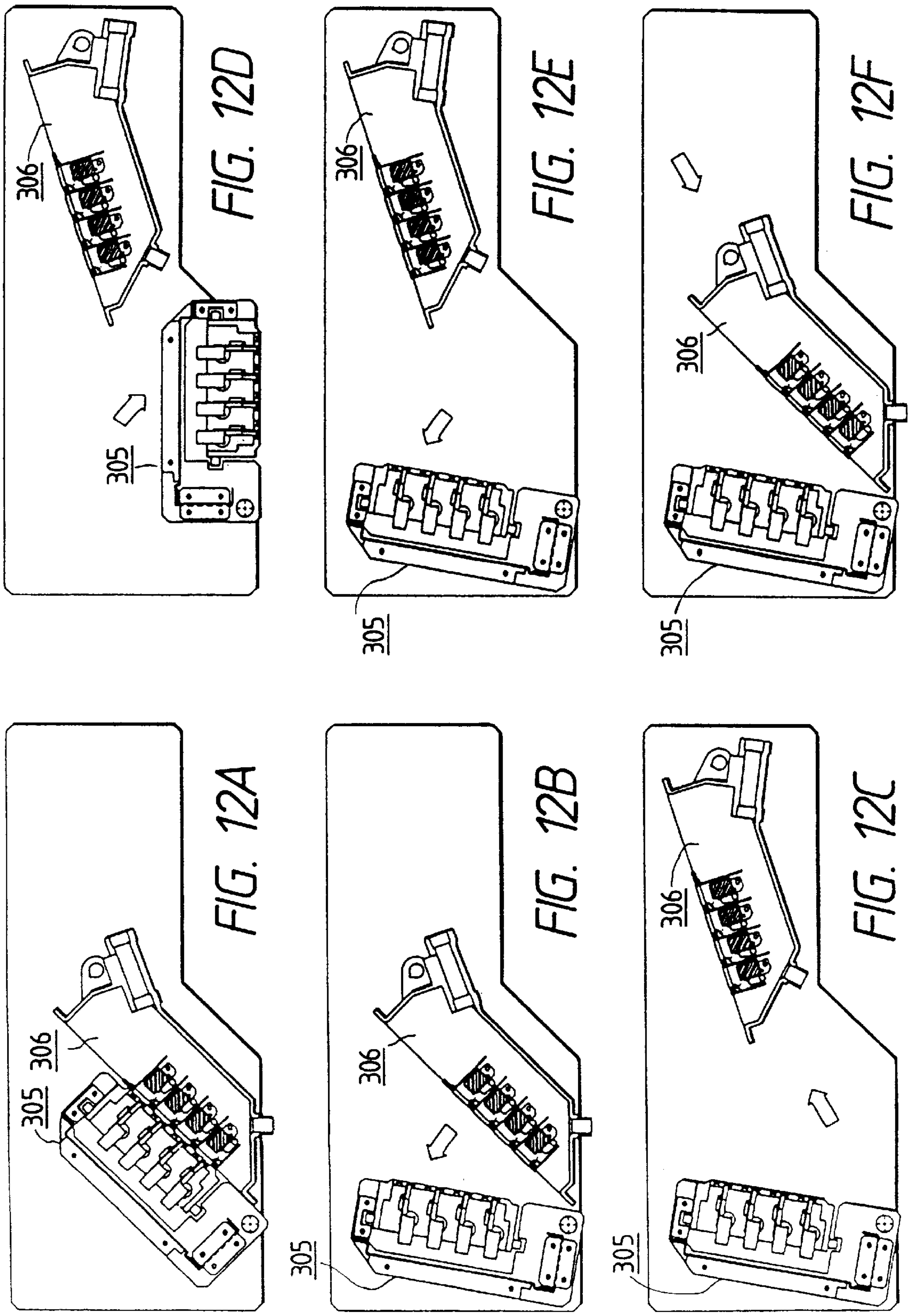
FIGS. 12A to 12F are views showing states of the recovery system shown in FIG. 9, from a stand-by state to a printing state.

In the following there will be explained the printing operation. FIGS. 12A to 12F illustrate states in transition from the aforementioned stand-by-state of the recovery system to the printing operation. FIG. 12A shows the above-explained capped state corresponding to the ordinary stand-by or pause state. If the print (copy) mode is selected in this state, there is at first effected the idle discharge explained above. Then assumed is a head-up state shown in FIG. 12B, in which the recording head unit 305 is retracted upwards. In this state the recovery reservoir 2, or the capping unit 306, is retracted to upper right to reach a unit open state shown in FIG. 12C. Then there is effected a head-down operation shown in FIG. 12D, whereby the recording head is brought to a position capable of recording, and the recovery reservoir 2 is placed in the retracted position. In this state the recording sheet is introduced from right with a predetermined gap from the discharge faces of the recording heads while the image signals are introduced to the recording heads 1C, 1M, 1Y, 1Bk to discharge inks therefrom, thus forming a print on the recording sheet.

After the printing by ink discharge, there is again conducted the head-up operation as shown in FIG. 12F, from which the recovery reservoir 2 moves toward the head to restore the capped stand-by state shown in FIG. 12A, for the next printing operation. The normal copying operation is conducted by the steps shown in FIGS. 12A to 12F. The above-explained ink circulating operation can be conducted at a predetermined timing in the capped stand-by state shown in FIG. 12A, for example at the start of power supply or after the lapse of a predetermined time, and it is possible in this manner to obtain a satisfactory image without sacrificing the through-put.

Figure 13:
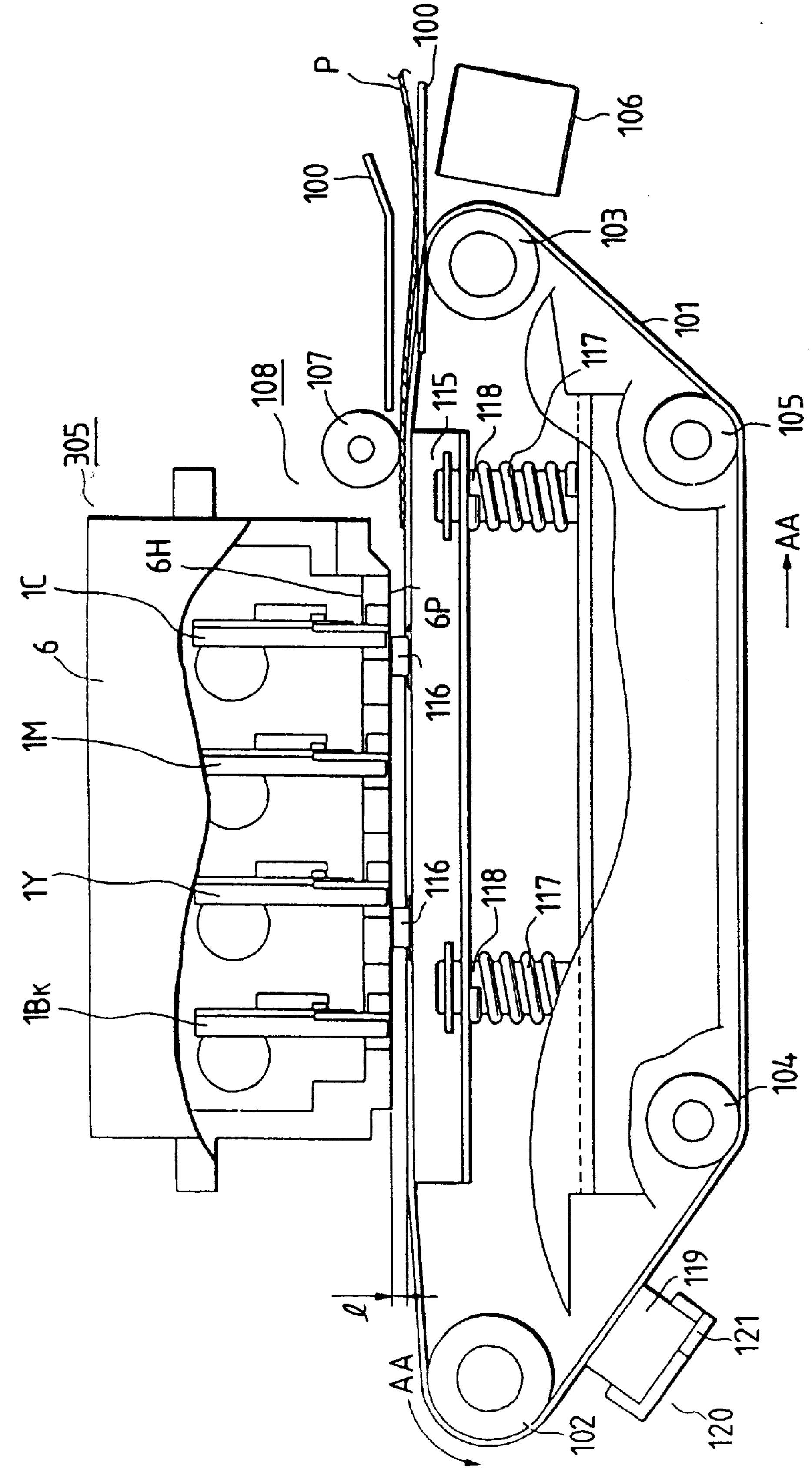
FIG. 13 is a detailed cross-sectional view of a belt conveyor unit shown in FIG. 1.

FIG. 13 schematically illustrates conveyor means (belt conveyor) for the recording material (paper). The recording paper P advanced by registration rollers (415, 416 in FIG. 1) reaches a conveyor belt 101 along guide plates 417, 418. Said conveyor belt is composed of two layers; an insulating layer (with preferable volume resistivity at least equal to $10^{12}$ Ω.cm) at a side in contact with the recording sheet, and a conductive layer (with preferable volume resistivity not exceeding $10^{8}$ Ω.cm) at the opposite side. Said conveyor belt 101 is mounted around a driving roller 102, an idler roller 103 and tension rollers 104, 105 with a tension of 2–5 kg, for example, and is driven in a direction AA, by a motor (not shown) connected to the driving roller 102.

The recording sheet P is placed on the conveyor belt 101, at a position immediately in front of a conductive roller 107. The surface of the conveyor belt 101 is given a potential of several hundred volts to several thousand volts by a charger 106. Upon reaching the grounded conductive roller 107, the recording sheet P is maintained in close contact with the conveyor belt 101 by electrostatic attractive force, whereby the sheet P is moved together with the conveyor belt 101.

In this state the recording sheet P reaches a recording area opposed to the recording head unit 305, containing the head block 6 and the recording heads 1C, 1M, 1Y, 1Bk, opposed to which there is provided a platen 115 across the conveyor belt 101. The platen 115 is provided with a pin 116, and is pressed against the recording head unit 305 by means of springs 117 and guide pins 118. For obtaining a recorded image of high quality, the distance between the recording heads 1C, 1M, 1Y, 1Bk and the recording face of the sheet P in the recording area is maintained at the predetermined value, preferably with a precision of about 100 μm. For this purpose, in order that the conveyor belt 101 is substantially flat in the recording area, the platen 115 has a flatness in the order of several microns in a face thereof in contact with said conveyor belt 101. Also the recording heads 1C, 1M, 1Y, 1Bk are so positioned in the head block 6 that the plane formed by the discharge plane of said heads have a flatness not exceeding several microns. The platen 115 is provided with a positioning pin 116 so that a gap l for passing the recording sheet is formed by the engagement of the upper end of said pin 116 with the head block 6, when the platen 115 is lifted by the springs 117 toward the head block 6 along the guide pins 118. When the recording sheet is transported in such structure, while it is maintained in close contact with the conveyor belt 101 by electrostatic attractive force, the distance between the recording face of said sheet and the discharge planes of the recording heads can be maintained within a desired precision with respect to the predetermined value.

In passing said recording area, the recording sheet is subjected to image recordings in succession by the recording heads 1C, 1M, 1Y, 1Bk. If the velocity of the conveyor belt 101 involves significant fluctuation, the recording positions of the recording heads are mutually aberrated thus resulting in aberrations or unevenness sin the colors of the image. In order to prevent such defects, the thickness of the conveyor belt 101, diameter of the driving roller 102 and revolving speed of the driving motor are controlled within predetermined precision to maintain the fluctuation of the velocity of the conveyor belt at a practically negligible level.

After image recording in the recording area, the recording sheet reaches the position of the driving roller 102 in contact with the conveyor belt 101, then separated therefrom by the curvature of said belt formed by the driving roller 102, and is advanced to the fixing unit.

Subsequently the surface of the conveyor belt 101 is cleaned with a cleaner 120 provided with an ink absorbing member 119, which is composed for example of a continuous pore foam of polyvinyl formal resin, and the absorbed ink flows out from an aperture 120 and is recovered.

In the present embodiment, the conveyor belt 101 has a two-layered structure composed of an insulating layer and a conductive layer, but it is also possible to constitute the conveyor belt 101 with a single insulating layer of a desired volume resistivity, or to adopt a multi-layered structure in the insulating layer and/or conductive layer.

In the following the structure of the fixing unit will be explained in detail.

In the ink jet recording, the ink is deposited on the recording material, and is fixed by penetration therein, or by evaporation of the solvent of said ink.

However the fixing speed, or the time from the deposition of ink to the fixing thereof, varies significantly not only by the structure and physical properties of the recording material but also by the condition of surrounding atmosphere. Also the spontaneous fixing speed cannot be shortened beyond a certain limit determined by the physical properties.

In the conventional serial scanning recording apparatus, the image fixing could be achieved with a relatively simple structure in consideration of the recording speed. However in the high speed recording in a line printer or the like or in the color image recording in recent years, the recording material may be brought out from the apparatus while the ink is not completely fixed. Therefore required is fixing means, as shown in FIG. 14, for effecting the image fixation more efficiently and reducing the time required therefor.

Figure 14:
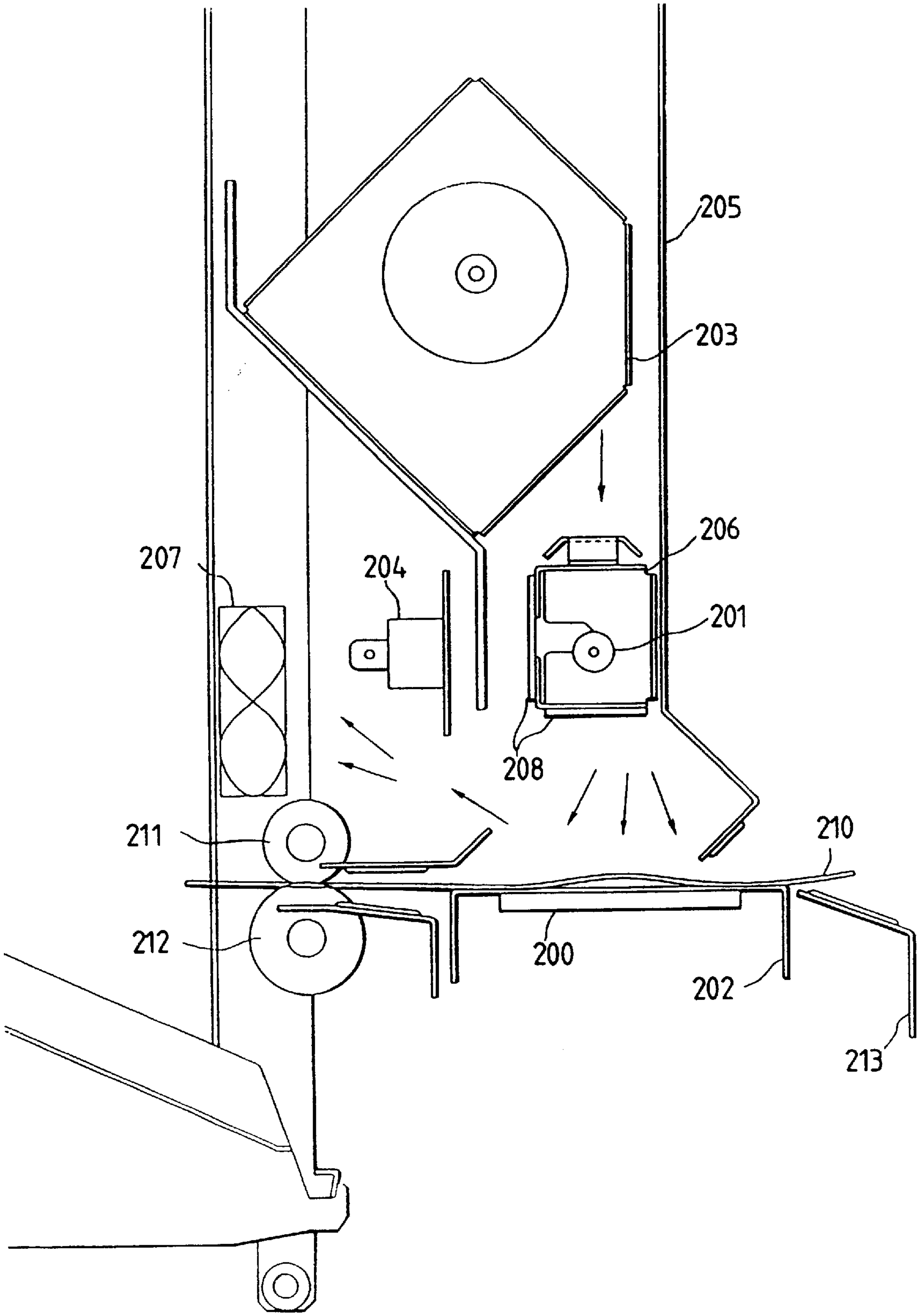
FIG. 14 is a detailed cross-sectional view of a sheet fix/exhaust unit shown in FIG. 1.

In FIG. 14, a heating member 200 and another heating member 201 respectively heat the unrecorded face and the ink bearing face of the recording material 210. Said heating member can be composed of various devices such as a halogen lamp, a sheath heater or a thermistor. In the present embodiment, the heating member 200 is composed of several thermistors capable of temperature control, which are attached to the rear face of a heat-conductive support member 202 for heating the unrecorded face of the recording material by direct contact. The heating member 201 is composed of a halogen heater, and hot air is sent by a fan 203 positioned above said heater 201 to heat the ink bearing face of the recording material 210 in non-contact state. Even when the recording material 210 is lifted from the support member 202 due to curling specific to the ink jet recording generated by the ink deposition, the recording material can be advanced securely along said support member 202 by the downward blow of the hot air from the fan 203. Consequently both faces of the recording material 210 are sufficiently dried to accelerate the ink penetration, and the fixing time is significantly reduced by the multiplying effect.

The fixing temperature is selected by a thermostat 204 controlling the temperature of said thermistor and heater, and can be suitably controlled according to the quality of the recording material. Also in order to prevent the undesirable effect of heat on the ink in the recording heads or in the supply system, there is provided a partition plate 205 having surface heat insulation composed for example of glass fibers and the heater holder 206 is composed of heat-resistant resin such as polyphenylene oxide (PPO), thereby avoiding unnecessary transmission of heat. Also provided is an exhaust fan 207 for discharging unnecessary heat.

A heater cover 208, composed for example of a metal grating, is provided for safety in case of jamming of the recording material.

In the above-explained structure, the recording material 210 is doubly fixed by direct heating on the non-recorded face and by hot air heating on the ink bearing face, thereby preventing the failure in image fixation in the ink jet recording, particularly resulting from undulation of the recording material, encountered in case of repeated ink depositing for example in color image jet recording.

Figures 1, 18:
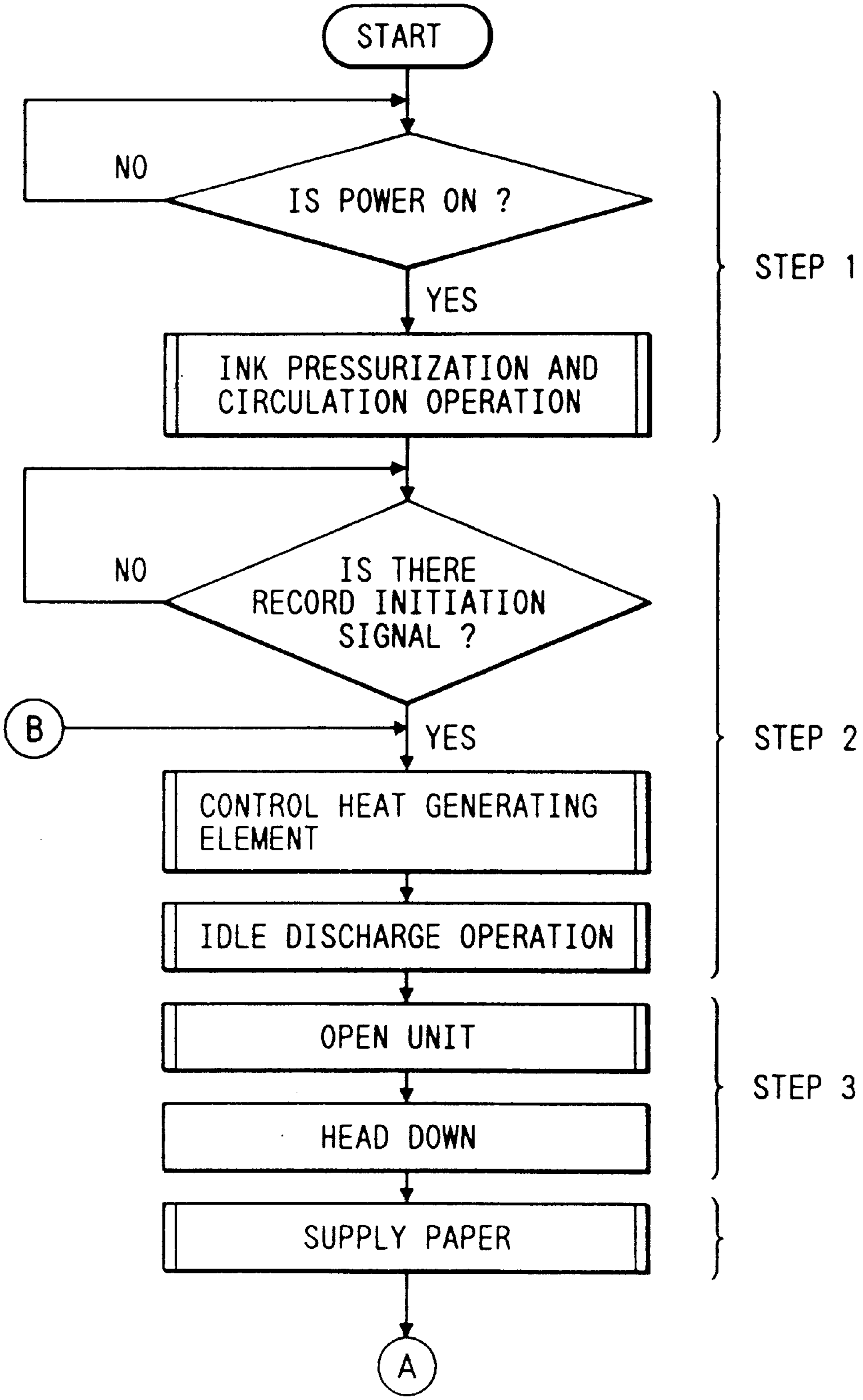
Figures 2, 18:
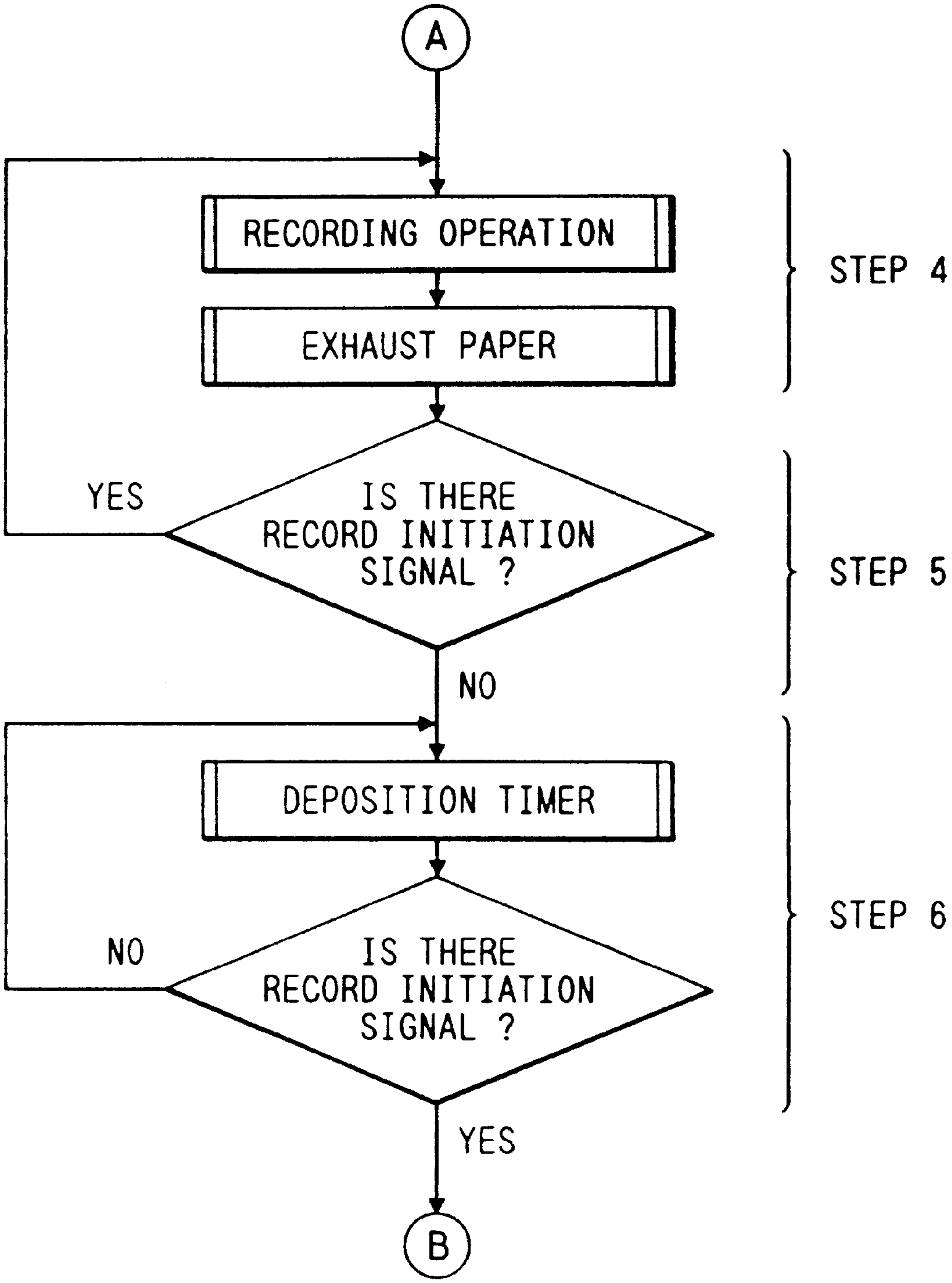

In the following there will be explained the image recording sequence of the present embodiment after the start of power supply therein, with reference to FIGS. 1, 2, 9 to 15 and flow charts shown in FIGS. 18 to 26, wherein FIGS. 19 to 26 show subroutines of the flow shown in FIG. 18.

When the power supply to the ink jet recording apparatus is turned on, there is conducted a series of steps of the capping shown in FIG. 11A, the pressurized ink circulation shown in FIG. 11B, squeezing of ink absorbing member shown in FIG. 11C and attaching of the ink absorbing member shown in FIG. 11D (FIG. 19: pressurized ink circulation subroutine), and the sequence returns to the capped state shown in FIG. 11A. This operation (step 1 in FIG. 18) can prevent failure in ink discharge resulting from viscosity increase of ink, caused by drying or evaporation thereof, or bubble generation, after a prolonged pause prior to the start of power supply. Said serial steps of capping (FIG. 11A), pressurized ink circulation (FIG. 11B), squeezing of absorbing member (FIG. 11C) and engagement of absorbing member (FIG. 11D), hereinafter collectively called pressurized ink circulating operation, is not only conducted immediately after the start of power supply, but also at every predetermined cycle time, measured for example by timer means, before trouble such as said ink drying or bubble generation occurs in the condition of high temperature or high humidity, or after a prolonged pause of operation after the start of power supply. In the vicinity of the recording head unit 305, there is provided a humidity sensor (not shown), for determining the interval of said pressurized ink circulating operations and controlling the duration of the ink pressurizing time. Under a low humidity condition, said cycle time is shortened, or said ink pressurizing time is elongated. Also simultaneous changes of there conditions proved to provide additional effect.

Figure 20:
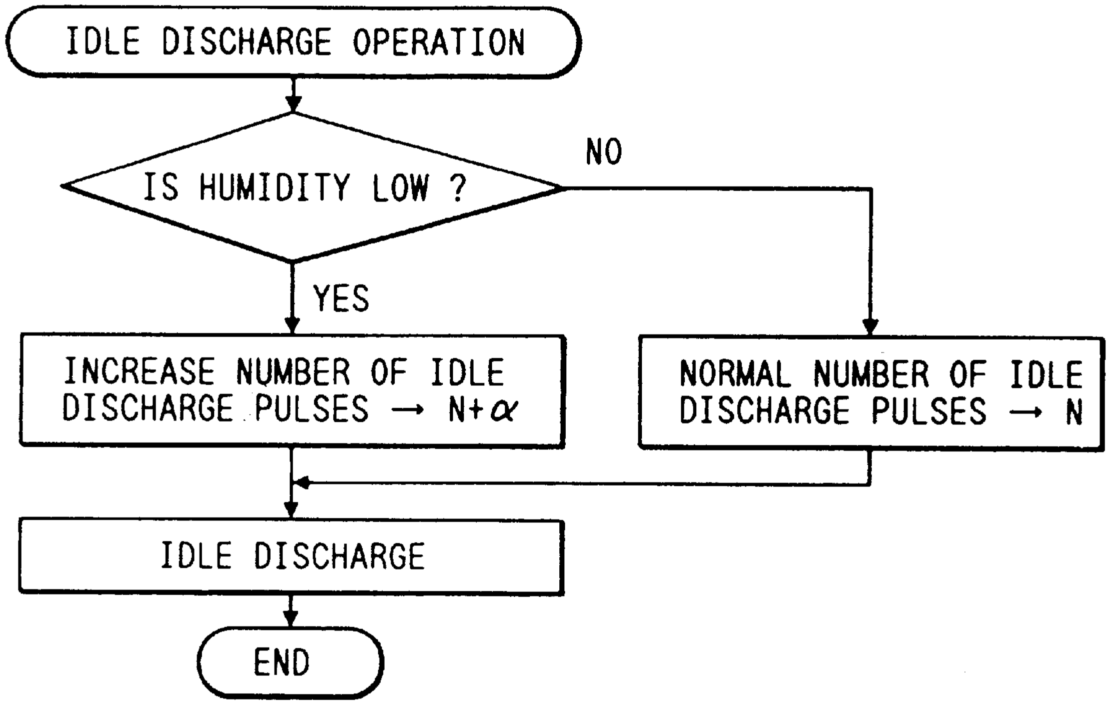
Figure 21:
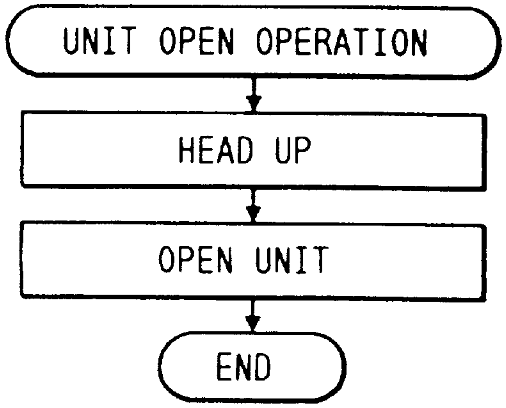
Figure 22:
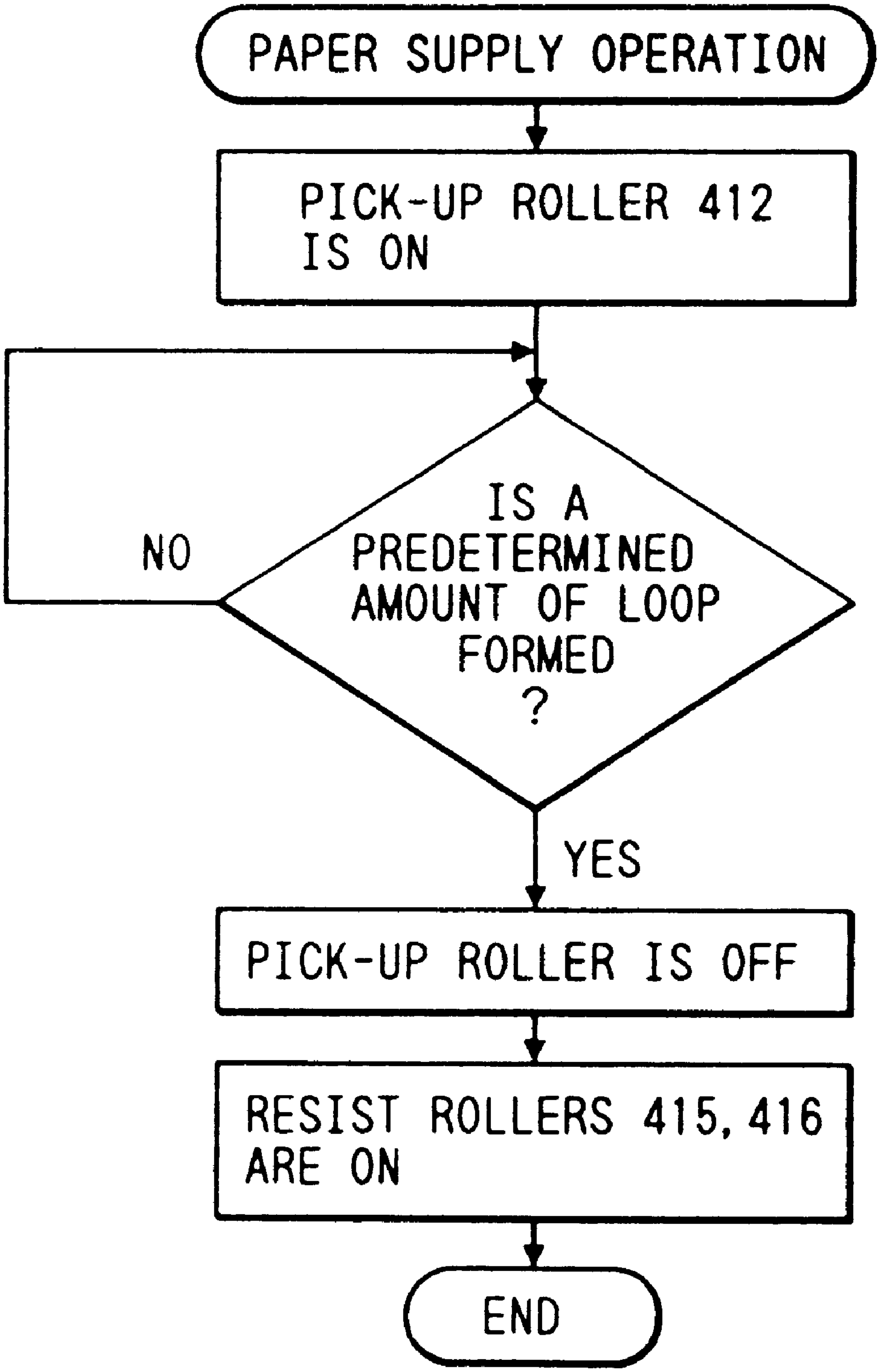
Figure 23:
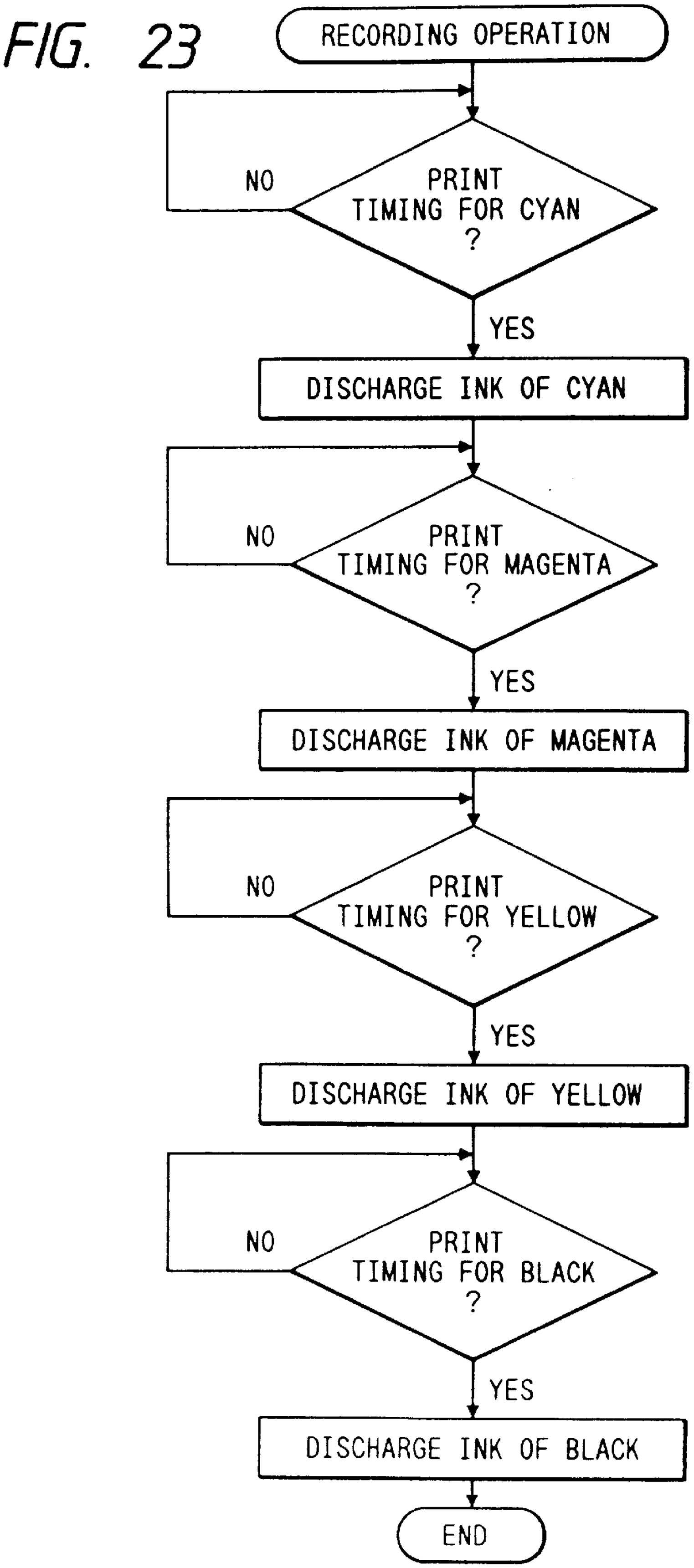

The capped state shown in FIG. 9 is maintained unless a recording start signal is entered. If said signal is entered, there is conducted the idle discharge operation, by giving a predetermined number of discharge pulses to all the nozzles of all the recording heads as explained in relation to FIG. 10, thereby preventing the discharge failure immediately before the recording operation. This operation is represented by a step 2 in FIG. 18. The number of pulses of said idle discharge is also controlled by said humidity sensor, as in the pressurized ink circulation explained above. More specifically, in a low humidity condition, said number of pulses for idle discharge is increased. Since the pressurized ink circulation is more effective than the idle discharge in preventing the discahrge failure, said cycle time for the pressurized ink circulating operation is determined by the time of viscosity increases or drying of the ink after the idle discharge operation. Consequently, in the unused state, the discharge faces of the recording heads are sealed from the atmosphere by the capping means to prevent the drying of ink to a certain extent, so that all the nozzles of the recording heads are rendered capable of ink discharge solely by the idle discharge operation. After the idle discharge operation, according to a subroutine shown in FIG. 20, is completed, there is conducted the unit opening operation, shown in FIGS. 12A to 12D in which the recording heads are retracted upwards and the recovery reservoir 2 is retracted to above right, according to a subroutine shown in FIG. 22. Subsequently there is conducted the head-down operation of a step 3 in FIG. 18, in which the head unit 305 is rotated about the shaft N so as that the discharge faces thereof are directed vertically-downwards and opposed to the sruface of the conveyor belt 101. The head unit 305 is brought into contact with an engaging face (not shown) provided on the head block 6 and with the pin 116 provided on the platen 115, slightly depressing the platen 115 against the force of the spring 117. The stopped position is detected by a print position sensor. Due to the characteristics of a worm gear (not shown) employed as part of the power transmitting system for the head unit 305, the head unit 305 can be stably maintained in said stop position, without being pushed up by the springs 117. Thus the recording heads are brought to the printable state. The sheet feeding operation is executed according to a subroutine shown in FIG. 22, wherein a recording sheet stored in a cassette 411 is advanced by a pickup roller 412, and advanced, through transport rollers 413, 414 and a guide 419 to the nip of registration roller 415, 416. After the front end of the sheet reaches said nip of the registration rollers 415, 416, the sheet is further advanced by the transport rollers 413, 414 for a certain period thereby forming a loop in the guide unit 419. This operation is usually adopted in an electrophotographic copying machine or the like, for registration of the front end of the sheet and correction of skewed advancement of the sheet.

Then the registration rollers 415, 416 are put into rotation to advance the sheet through the guides 417, 418 onto the conveyor belt 101. In response to the start of rotation of the registration rollers 415, 416, there are generated a scanning start signal and print start signals for the recording heads 1C, 1M, 1Y, 1Bk. The recording sheet advanced onto the conveyor belt 101 adheres thereto by electrostatic attractive force starting from the front end of the sheet, and is subjected to image printing under said recording heads, with an appropriate gap between the discharge faces of said recording heads and said sheet by the aforementioned means. This operation is conducted according to a subroutine shown in FIG. 23. Thereafter the sheet advances to the fixing/exhaust unit 307 and is transferred from the conveyor belt 101 to a guide 213 by so-called curvature separation in which the driving roller 102 has a relatively small diameter and the sheet is separated spontaneously by the rigidity thereof. The diameter of the driving roller 102 is so selected that the moving distance of the surface of the conveyor belt 101 which is friction driven by said roller is equal to the distance between the discharge ports of the first head 1C and the fourth head 1Bk. This is to prevent possible aberration in the registration of images in case an eccentricity exists in the driving roller 102. Ideally, the surface of the conveyor belt 101 is moved by a distance between the discharge ports of immediately neighboring recording heads by a revolution of the driving roller, but the diameter of the driving roller 102 cannot be made too small in consideration of the mechanical strength. For a distance corresponding to four heads, said roller has to be inevitably large, eventually leading to the bulkiness of the apparatus, because the distance is tripled. In the present embodiment, there is considered the distance between the first and fourth heads as said distance is largest among the heads and involves most the factors giving rise to errors in the registration. Naturally this is not limitative, and there may be adopted the distance between the first and third heads or between the immediately neighboring heads. In any case, however, certain concentration is necessary on the relationship between the diameter of the driving roller and the distance between the recording heads.

Figure 24:
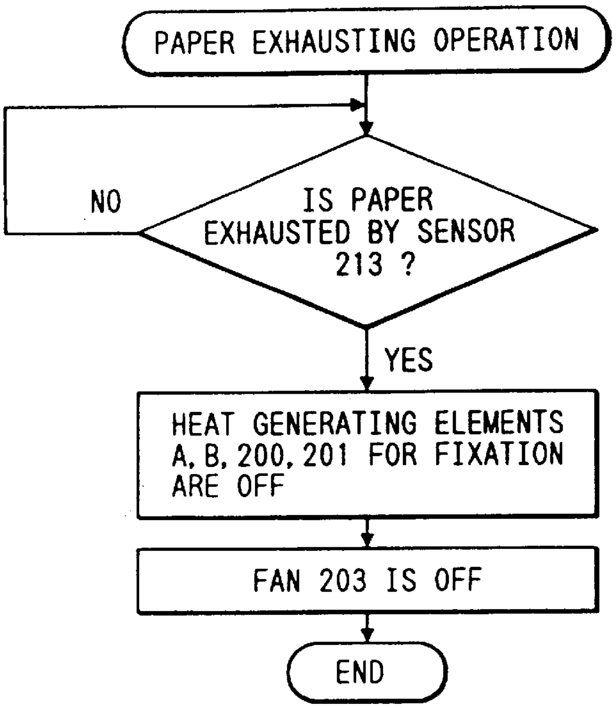
Figure 25:
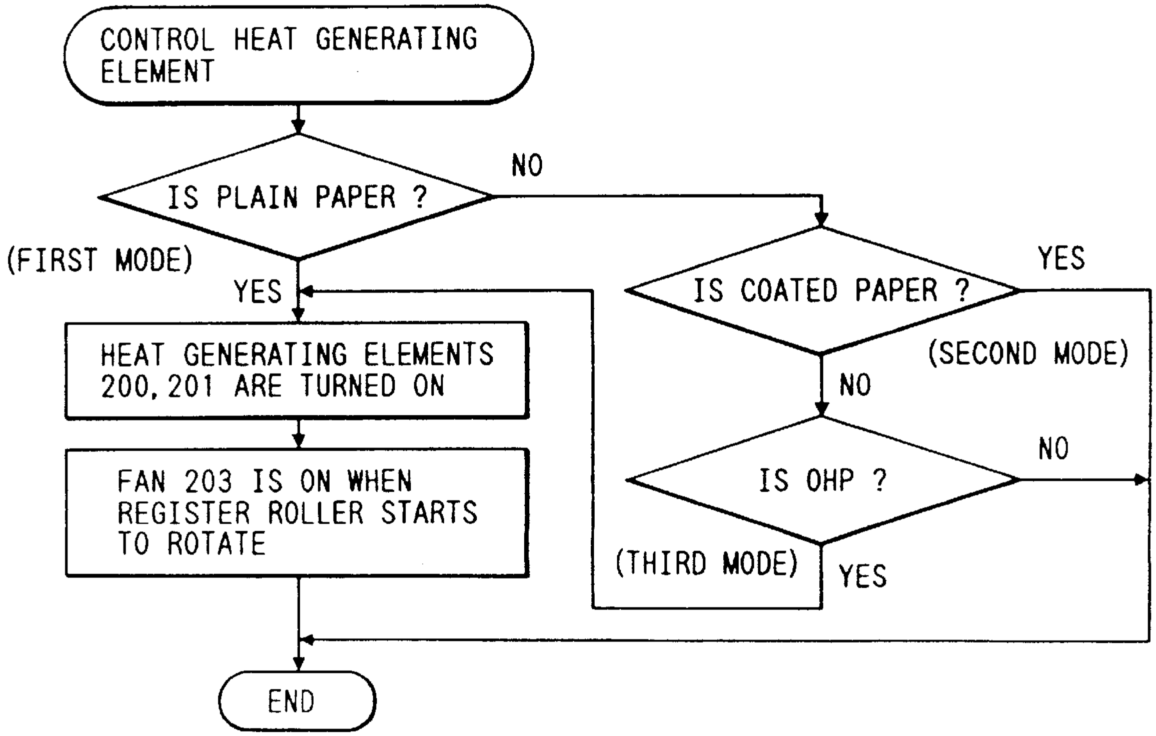

The fixing step for the sheet transported to the fixing/exhaust unit 307 is conducted in one of three modes which will be explained in the following with reference to a subroutine shown in FIG. 24. A coated sheet, if employed as the recording sheet, does not require any fixation as explained above, but a non-coated sheet, called plain paper in electrophotographic copying machines, requires fixing means. In a first mode for plain paper, the power supply to the heating members 200, 201 is turned on simultaneously with a recording sheet signal. The fan 203 is activated at the timing of transfer of the sheet from the conveyor belt 101 to the guide 213, measured by timer means from the rotation start signal for the registration rollers 415, 416.

The above-explained operation is designed in consideration of a fact that the halogen heater of the heating member 201 requires 1 to 2 seconds for reaching the predetermined temperature. If the fan 203 is started from the beginning thereby blowing said heater, the above-mentioned time is extended so that said predetermined temperature is not yet reached when the sheet is advanced to the fixing unit 307, whereby the fixing effect is adversely affected. In a second mode in FIG. 25 in which coated paper is used as the recording sheet, a mode key in an unrepresented operation unit is actuated to select said mode and the image recording is initiated by a recording start signal, and, in this case, the heating members 200, 201 are both not energized. The above-mentioned fixing means is not required for the coated paper, since, as explained before, the ink is rapidly absorbed, therein. However, in consideration of possible error in the operation, the first mode for plain paper is preferential, and the fixing means is energized unless the second mode for coated paper is selected by the operator. It is therefore possible to avoid such drawback as the transfer of ink onto the exhaust rollers 211, causing smears on other recording sheets, even when an image to be printed on a coated paper is printed on a plain paper by mistake.

The present embodiment also has a third mode for printing on an overhead projector (OHP) film. Though the OHP sheet to be employed in the present embodiment has a coating similar to that on the coated paper, there will result ink oozing or ink flow if the printing is repeated in the same place within a short period. Also the complete ink absorption into the coated layer requires a long time, so that the image may be perturbed or transferred if the formed image touches something else within a short time after image formation. In order to prevent such drawbacks, the next image formation is delayed for achieving complete ink absorption, and to prevent the image from any contact after the image formation, in order to avoid the ink transfer. It is also possible to use fixing means in such period. In the present embodiment, all the transport speeds, including the sheet feeding speed, conveyor belt speed and sheet exhaust speed, are lowered to a level capable of avoiding the above-mentioned drawbacks, while the ratio of said speeds is maintained same as that in the first or second mode. At the same time, the driving frequency of the recording heads is naturally modified so as to obtain a proper image. When the OHP mode is selected by a mode key in said operation unit (not shown), in response to the recording start signal, the sheet transport speed from the sheet feed unit 303 to the registration rollers 415, 416, speed of the conveyor belt of the unit 304, and the speed of the exhaust rollers 211, 212 are all reduced as explained above, and the heating members 200, 201 and the fan 203 are turned on with the timing as in the first mode to assist the image fixation.

The plain paper, coated paper and OHP sheet explained above are eventually emitted by the exhaust rollers 211, 212 onto a tray 420, but the transporting speed of various units is different for these sheets for the reason and manner as explained in the following.

In the structure of the present embodiment, the process speed determined by the recording speed is attained by the velocity of the conveyor belt 101. Stated differently, the velocity of the conveyor belt 101 is selected equal to the process speed. Therefore, when the printing by the recording heads is conducted with a correct speed, the obtained print is contracted or elongated in the transported direction of sheet respectively if the conveyor belt 101 is slower or faster than the predetermined speed. In consideration of this fact, the transporting speed of the registration rollers 415, 416 is selected slightly larger than that of the conveyor belt 101, in order that the transporting ability thereof is not affected by that of the registration rollers 415, 416. The sheet is transferred from the registration rollers 415, 416 to the conveyor belt 101 and is held thereon electrostatically, but, at the start of printing by the first recording head, the sheet is electrostatically attracted only in a front end portion thereof. Consequently, if the transporting speed of said registration rollers 415, 416 is selected lower than that of the conveyor belt 101, the sheet is governed by the transporting power of the registration rollers 415, 416 whereby the image is formed in abnormal manner until a point where the sheet is electrostatically attracted by the belt 101 over a larger length and is governed by the transporting power of the belt 101. For this reason, in the present embodiment, the transporting speed of the registration rollers 415, 416 is selected larger than that of the conveyor belt 101, and the stress in the sheet resulting from the speed difference is absorbed by a loop formed between the guides 417, 418. Consequently, in this structure, the transporting power of the rollers 415, 416 does not affect that of the belt 101. However, if said speed difference becomes larger, said loop in the sheet becomes larger and the electrostatic attraction becomes unstable for example due to the movement of said loop. Consequently said speed difference is as small as possible in the positive range, namely it is selected from zero to a small positive value. Experimentally it is preferably in a range of 0 to 1.5% in the speed ratio. Then there will be explained the transporting speed in the sheet exhaust unit. In the usual structure, there can be formed a loop in the sheet between the belt 101 and the rollers 211, 212 in order not to affect the transporting speed of said belt, as in the aforementioned relation between the registration rollers and the conveyor belt. In the present embodiment, however, due to the presence of the heating member 200 at the downstream side of the conveyor unit 304 for heating the rear face of the sheet, said loop formation in this part significantly deteriorates the fixing effect since the sheet can no longer proceed along the support member 202. Consequently, in the present embodiment, the transporting speed of the exhaust rollers 211, 212 is selected larger than that of the belt 101, thereby preventing the loop formation. In addition, the surface of the support member 202 of the heating member 200 is positioned slightly higher than a plane connecting the surface of the belt 101 and the nip of the exhaust rollers 211, 212, whereby the sheet is transported securely along the surface of the support member 202 once the front end of the sheet is pinched between the rollers 211, 212. The transporting power of said rollers 211, 212 is adequately controlled so as not to exceed that of the belt 101. This is achieved by forming naps of nylon fibers on the surface of the roller 211 coming into contact with the image bearing face of the sheet, thereby reducing the friction and also serving to prevent the ink offsetting, and by forming the roller 212 with a resin such as polyacetal resin.

The above-explained selection of transporting speeds enables satisfactory recording without perturbation in the image.

In the following the sheet transportation by the transport unit 304 will be discussed further. As explained above, a fluctuation in the transporting speed of said unit 304 not only induces an elongation or a contraction of the recorded image, but also results in an aberration of image registration or an uneven color in an image formed by superposition of inks, such as a color image. Therefore the precision of movement of the conveyor belt 101 has to be satisfactorily controlled by giving sufficient attention to the driving source for the driving roller 102, diameter thereof and thickness of the belt 101. Consideration has also to be given to any other factor giving perturbation to the transport unit 405 and enhancing said fluctuation. In the present embodiment, at the transfer of the sheet from the registration rollers 415, 416 to the conveyor belt 101, said belt 101 is pushed by the sheet because the transporting speed of the registration rollers 415, 416 is faster than that of the belt 101, and said pushing force affects the uniformity of transporting speed thereof, eventually causing an unevenness in color or an aberration in the registration of images as explained above if a preceding sheet is under printing. In order to prevent such problem, the present embodiment employs such a sequence, in the continuous image recording, as to transfer the succeeding sheet onto the conveyor belt 101 after the rear end of the preceding sheet passes through the fourth recording head, so that the transfer of the succeeding sheet onto the belt 101 does not take place during the printing operation for the preceding sheet. This is achieved by timer means which activates the registration rollers 415, 416 by calculating the passing time of the rear end of sheet through the fourth recording head, in consideration of the longitudinal size of the transported sheet.

The sequence from the start of recording to the end thereof and the emission of the sheet is conducted in the manner explained above. After the recording of a predetermined number of sheets, there are conducted the head-up operation and the unit closing operation as shown in FIGS. 12E and 12F, and the capped state shown in FIG. 3 is finally assumed to terminate the recording operation. In the first or third mode, the power supply to the heating members 200, 201 and the fan 203 is terminated when the rear end of the sheet passes the rollers 211, 212. This timing is determined by the sensor 213 for detecting the passing of the front end of the sheet, in relation to the arm 214, as shown in the subroutine in FIG. 24.

A step 5 therein represents the repetition of the recording operation for the predetermined number of sheets.

Figure 15:
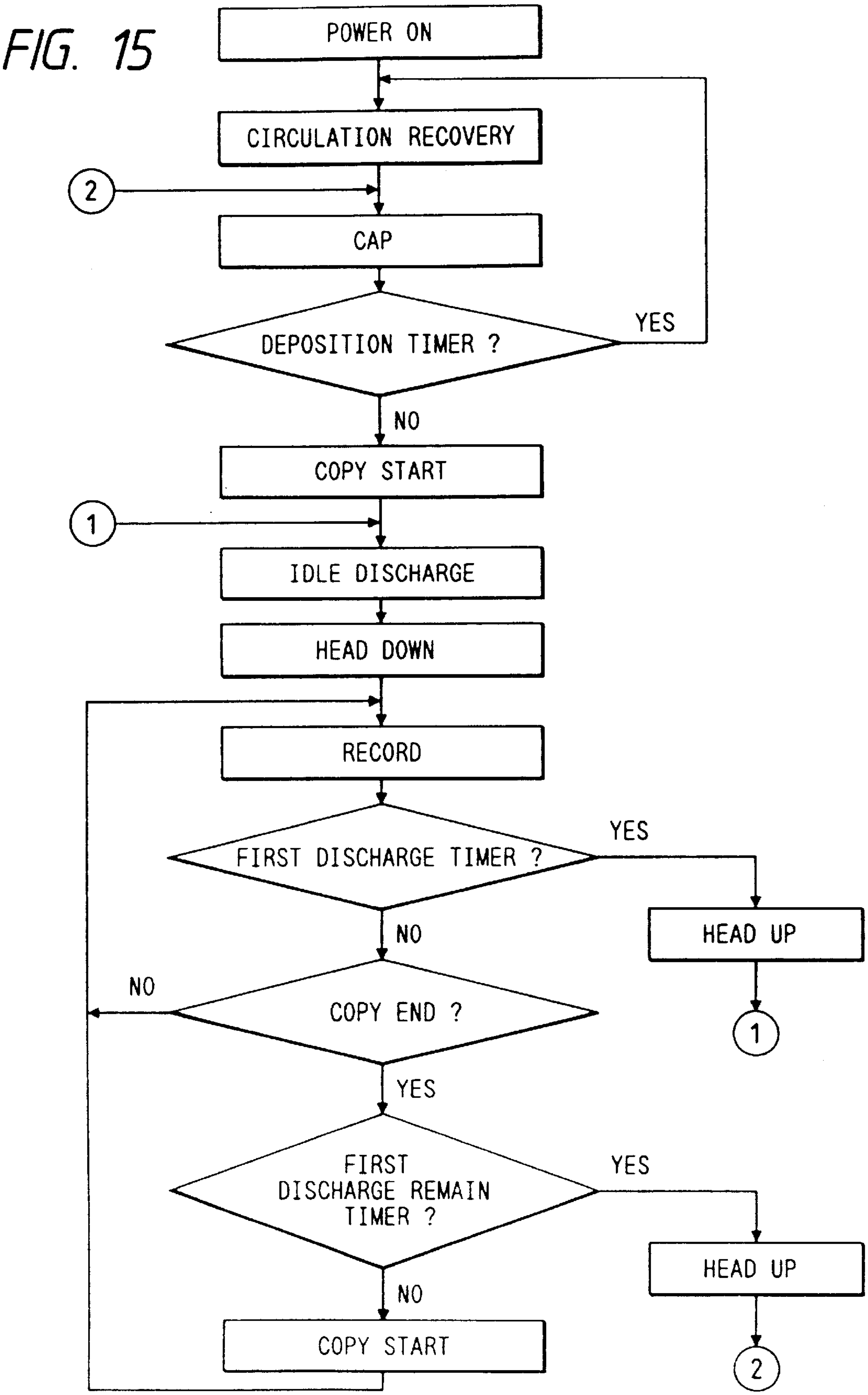
FIG. 15 is a flow chart showing a head control sequence.
Figure 19:
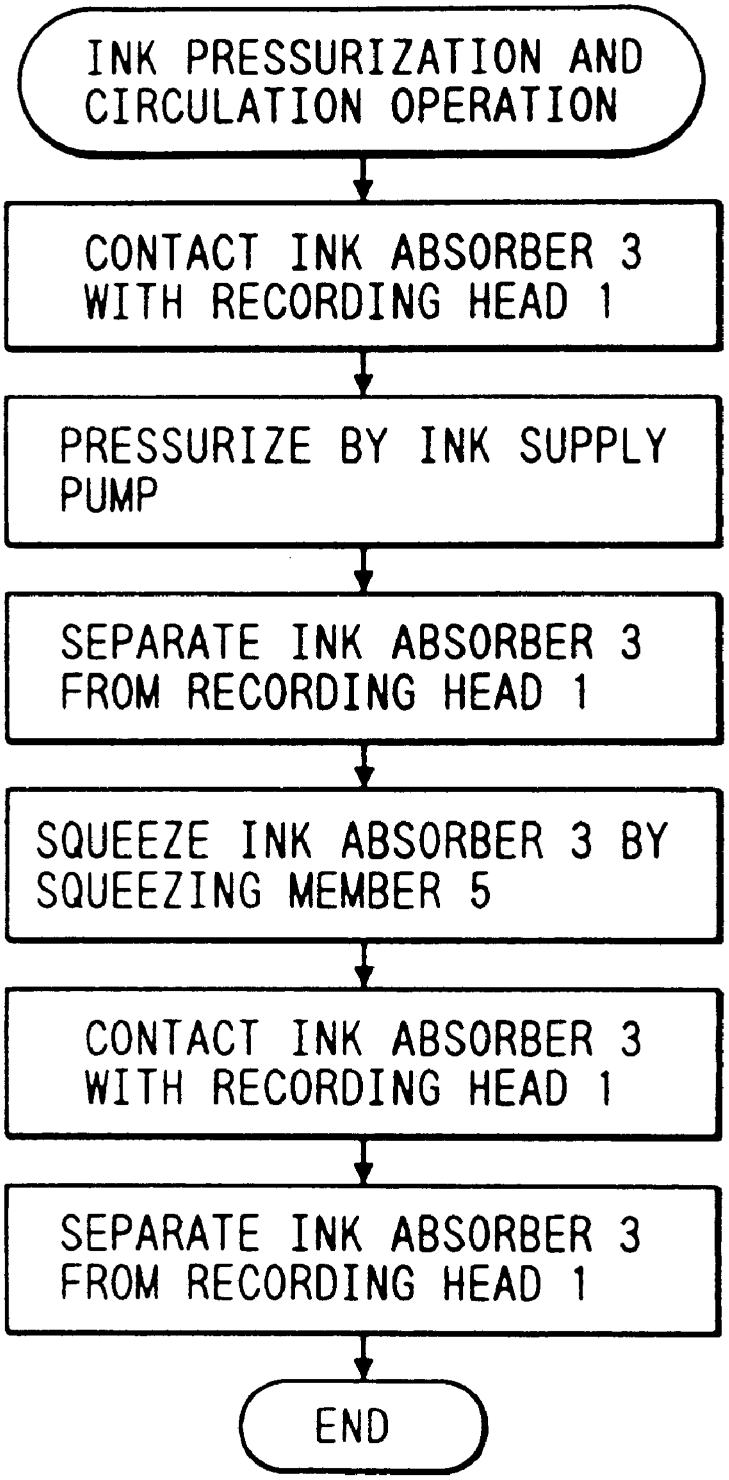
FIGS. 19 to 26 are flow charts of sub-routines of ink pressurizing/circulation, ink idle emission, unit opening operation, sheet feeding, recording, sheet exhaust, heating member control and deposition timer operation.
Figure 26:
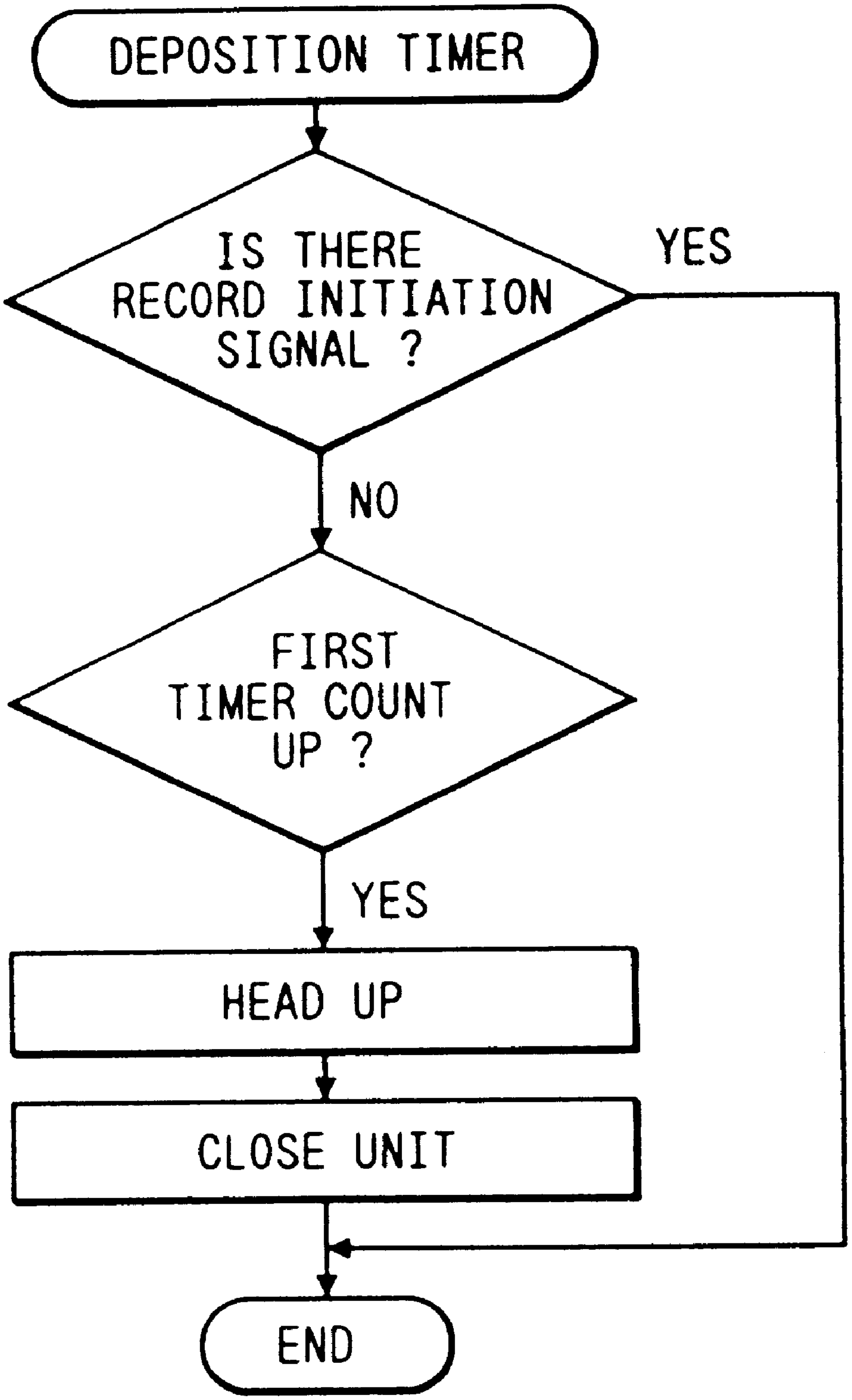

Now there will be explained a head control sequence for preventing discharge failure of a step 6 in FIG. 19, with reference to FIGS. 15 and 26.

At the start of power supply to the apparatus, there is at first conducted the ink circulating operation as explained before, in consideration of the possibility of a long pause in operation prior to said start of power supply. Thereafter the apparatus awaits the entry of a recording start signal in the capped state, but the ink circulating operation is repeated if ink drying timer means functions. Said timer serves to prevent the ink discharge failure resulting from an increase in the ink viscosity in case the non-recording state continues even after the start of power supply, and the time of said timer is generally in the order of hours, though it depends on the properties of ink and the conditions of use thereof.

Then, in response to the entry of the recording start signal, there are conducted the idle discharge operation, head-down operation and printing operation. If the first discharge timer functions in the course of printing, the recording heads are lifted up for effecting idle discharge, and then lowered again to continue the printing operation. Said first discharge timer effects the idle discharge at a predetermined time from the preceding idle discharge, in order to prevent discharge failure in the nozzles which are not used in the printing operation. This operation is to rectify slight discharge failure by the idle discharge, and is repeated at an interval of the order of minutes. After the image recording of the predetermined number of sheets, the head-down state is maintained for the duration of the first discharge timer, awaiting the entry of the next recording start signal. If said start signal is not entered in said duration, there are conducted the head-up operation and the unit closing operation, and the apparatus enters the capped state. On the other hand, if the recording start signal is entered in said duration, the recording operation is started according to the above-explained sequence (cf. flow chart in FIG. 27). Said first discharge timer may be replaced by a timer which measures a time corresponding to the difference obtained by subtracting the time from the preceding idle discharge to the end of image recording, from the time of said first discharge timer. In practice, however, the time of said timer is selected somewhat shorter than said difference, since the ink dries more easily as the heads are in the uncapped down state.

The above-explained recovery operation is securely achievable, but has to be conducted by interrupting the recording operation if in the course of such recording operation, and may cause a delay in the recording. In the following there will be explained a structure capable of coping with such drawback though it is not essential.

In said structure, the idle ink discharge for preventing the discharge failure of the recording heads is conducted onto the conveyor belt between the recording sheets, whereby said idle discharge can be conducted without interruption of the recording operation.

In the following there will be explained a modified sequence for presenting the discharge failure. In response to a recording start signal, the conveyor belt is started and idle discharge is conducted onto said conveyor blet. Said idle discharge is completed before the recording sheet reaches a position below the recording heads, and the printing operation is conducted onto said recording sheet. The ink of idle discharge deposited on the conveyor belt is removed by a cleaner 120 having an ink absorbing member 119, which is composed of a continuous pore foam for example of polyvinyl formal resin. The ink absorbed therein flows out from and is recovered from an aperture 120. Thus the recording sheet is not smeared by the ink of idle discharge remaining on the conveyor belt. The idle discharge is repeated if the first discharge timer functions in the course of recording operation. The recording sheets are usually spaced by a gap of 50 to 150 mm, and the idle discharge in the course of recording operation is conducted onto the conveyor belt in said gap, so that the recording operation need not be interrupted.

Said first discharge timer effects the idle discharge at a predetermined time from the preceding idle discharge, in order to prevent discharge failure in the nozzles which are not used in the printing operation. This operation is to rectify slight discharge failure by the idle discharge, and is repeated at an interval of the order of certain minutes. After the image recording of the predetermined number of sheets, the head-down state is maintained for the duration of a first discharge remaining-time timer, thus awaiting the entry of the next recording start signal. If said start signal is not entered within said duration, there is conducted the head-up operation, and the capped state is assumed. On the other hand, if the recording start signal is entered within said duration, the recording operation is started according to the above-explained sequence. Said first discharge remaining-time timer measures a time corresponding to the difference obtained by subtracting the time from the preceding idle discharge to the end of image recording, from the time of said first discharge timer, but, in practice, said time is selected somewhat shorter than said difference in consideration of the fact that the ink dries more easily as the heads are in the uncapped down state.

It is therefore possible to effect the recovery operation and the prevention of discharge failure of the recording heads, without interrupting the recording operation.

The features of the structure disclosed in the foregoing embodiment can be summarized in the following, and the present invention includes all these features singly or in combination according to the purpose.

In the ink jet recording apparatus having a long multi-orifice recording head of the present invention, said recording head unit is rendered capable of movement by rotation, and the aperture in such rotated state is positioned at the upstream side in the transporting direction of the recording material, whereby provided are advantages of protection of the discharge face of the recording head at the jamming of said recording material, ease of disposal of such jammed recording material, and prevention of drying or adhesion of ink on said discharge face, caused by the heat of the fixing unit which is usually positioned at the downstream side.

Also said ink jet recording apparatus is provided with the ink absorbing members, means for attaching or separating said absorbing members to or from the discharge faces of the recording head, squeezing means for the absorbing members, means for preventing mixing of absorbed inks, means for preventing drying of the discharge faces of the recording head, and means for wiping said discharge faces, whereby stable ink discharge from the discharge ports of the recording head is ensured, thus preventing defective discharge, including discharge failure, and providing an image of high quality. Also there is provided an apparatus with a recording head of high reliability, high durability and long service life.

Also said ink jet recording apparatus is provided with the recovery system, in which the head wiping means is operated in relation to the separating operation of the ink absorbing members from the discharge faces of the recording head, whereby the cleaning of said discharge faces and the recovery of defective nozzles can be achieved rapidly and efficiently, so that the recovery operation can be done in a shorter time and in a more effective manner.

Also said ink jet recording apparatus, is provided with the recovery system, in which the wiping means for the discharge faces of the recording head serves as the squeezing means for the ink absorbing members, whereby the ink absorbing members are squeezed to restore the absorbing ability thereof simultaneously with the wiping of the ink on the discharge faces. Thus the cleaning of said discharge faces of the recording head and the recovery operation of the defective nozzles can be achieved rapidly and efficiently.

Furthermore, in such ink jet recording apparatus, the recording head, the supporting and moving means therefor, the head recovery system and the moving means therefor are constructed as an integral unit which is detachably mounted in the main body, whereby the entire apparatus can be compactized. Also such unit structure provides an advantage of maintenance-free apparatus.

Figure 27:
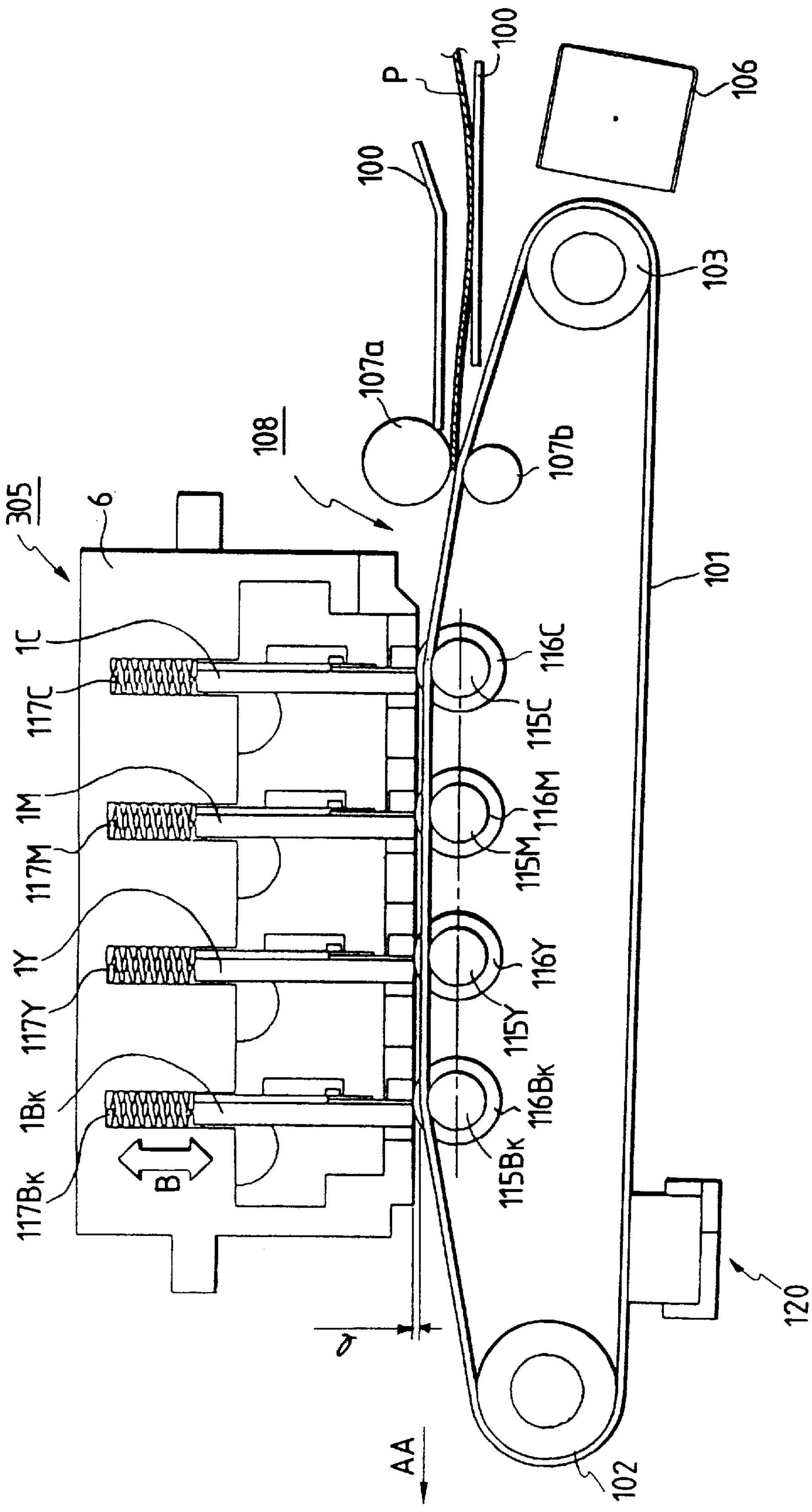
FIG. 27 is the schematic sectional view to indicate the key section of the present invention.

In FIG. 27, key section structure 108 is provided with head block 6, recording heads, 1C, 1M, 1Y and 1Bk and facing such members, the carriers are provided with carrier guides (hereinafter called back-up rollers) 115C, 115M, 115Y, 115BK, pushing members (hereinafter called rollers) 116C, 116M, 116Y, 116BK, springs 117C, 117M, 117Y and 117BK and pushing roller guide 118 of FIG. 28.

Back-up rollers 115C, 115M, 115Y, 116BK are rotatively supported by the side board not indicated in the drawing, via bearings, together with driving roller 102 and follower roller 103. Their displacement is restricted to several $\mu$m. Pushing rollers 116C, 116M, 116Y and 116BK are provided on the same axis with the aforesaid back-up rollers 115C, 115M, 115Y and 115BK. The deviation of their outer diameter can be restricted to about several $\mu$m. These pushing rollers 116C to 116BK are provided at both ends of back-up rollers 115C to 115BK and they pushingly contact the pushing surface of recording heads 1C to 1BK. The pushing surface at the side of the recording head is preferrably on the same plane with the nozzle but the present invention is not limited to such set-up. Springs 117C to 117BK are supporting the recording heads 1C to 1BK against the rollers 116C to 116BK and they are movable in the direction of arrow B in the Figure.

Carrier belt 101 is manufactured with the tolerance in thickness of several $\mu$m and it moves in contact with the back-up rollers 115C to 115BK and the recording sheet tightly contacts the carrier belt due to the electrostatic attractive force. Therefore by maintaining the space between the back-up rollers 115C to 115Bk and recording heads 1C to 1BK with precision, it is possible to maintain the distance between the recording surface of the recording sheet and the discharge port of the recording head with the accuracy of around 50–70 $\mu$m.

Figure 28:
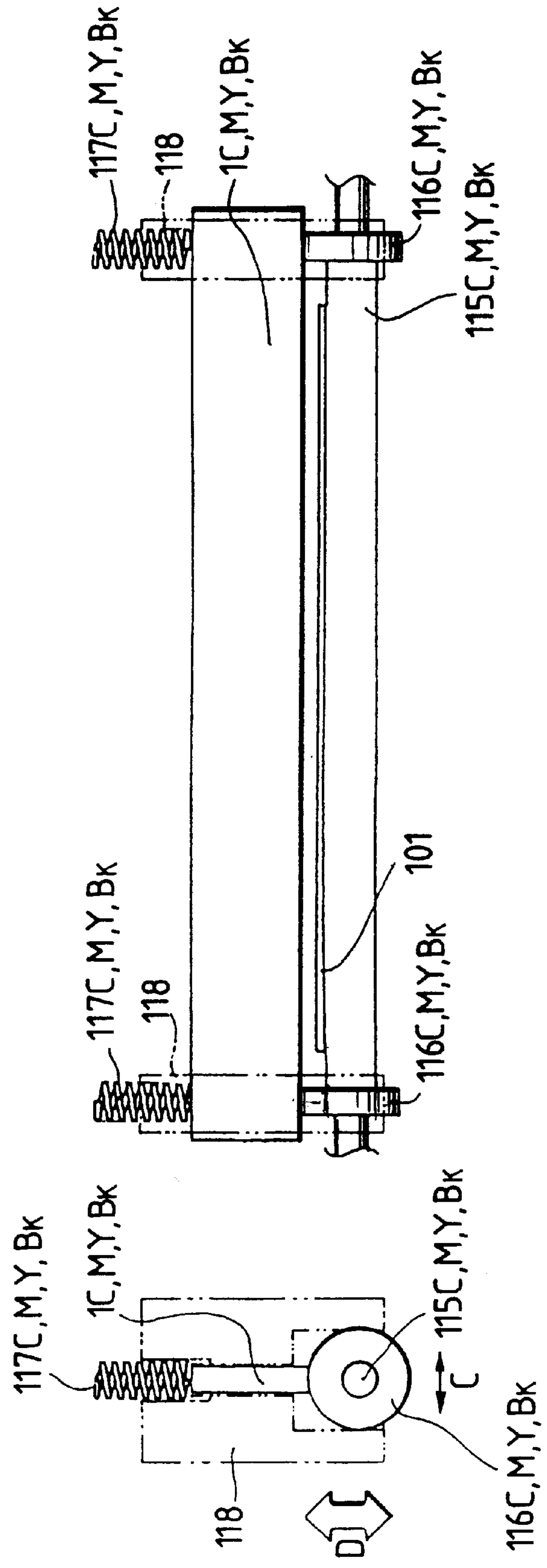
FIG. 28 is the schematic drawing of the key section of the present invention shown in FIG. 29.
Figure 29:
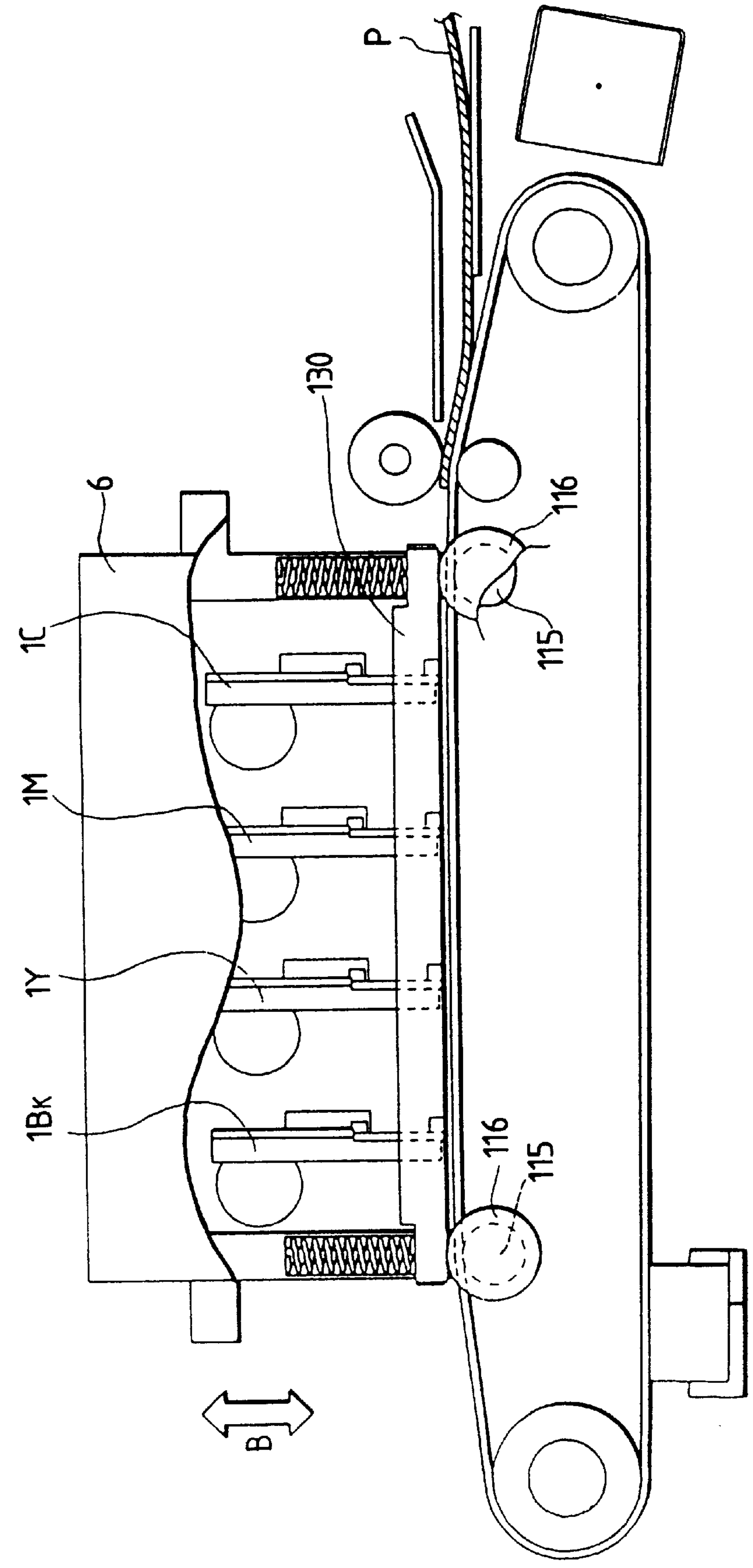
FIGS. 29, 30 and 31 are the schematic sectional views to illustrate other examples of practise.

FIG. 28 shows the side view of the key sections such as recording head 1, back-up roller 115 etc. indicated in FIG. 29. As shown in the Figure, pushing roller 116 is provided at both ends of the pair of recording head 1 and back-up roller 115, and spring 117 is installed facing thereto and therefore even when the back-up roller 115 is slightly inclined, the recording head 1 can follow up its motion and the difference in clearance between nozzle surface and the belt at the front and rear part can be restricted. Centering of the discharge port of recording head 1 and the axial line of the back-up roller 115 is effected by the pushing roller guide 118. When the outer diameter of the pushing roller 116 is ø12, even when the axis of back-up roller 115 deviates by ±0.5 mm in the direction of arrow C, it does not amount to the deviation over ±10 $\mu$m in the direction of arrow D in the Figure and therefore the clearance between the outer diameter of pushing roller 116 and the groove which faces the pushing roller guide 118 may be fairly large.

When the recording head section 305 moves to the position shown in FIG. 2B, the system takes the state shown in FIG. 27. During such step, the pushing surface of each recording head hits the rollers 116C–116Bk. Pushing roller 116 enters into the groove corresponding to the pushing roller guide 118 but since there is a clearance between the outer diameter of the roller and the groove, recording head section 305 can smoothly take the state shown in FIG. 27. At such time, the clearance between the recording surface of the recording sheet on the surface of discharge port of the recording head is maintained at less than 100 $\mu$m as stated above.

Since the back-up rollers 115C–115Bk are in contact with the fixed section via a bearing, they rotate smoothly following up the motion of carrier belt 106. Thus the driving torque is small and precision of rotation of driving source is high, precision of movement of the said carrier belt is high and the amount of color aberration is small.

Under such state, the recording sheet moves through the gap l in the direction of arrow A and it is printed on by each recording head. At this time, clearance between the discharge port surface of the recording head and the recording surface of the recording sheet is maintained at 50–70 $\mu$m.

Figure 30:
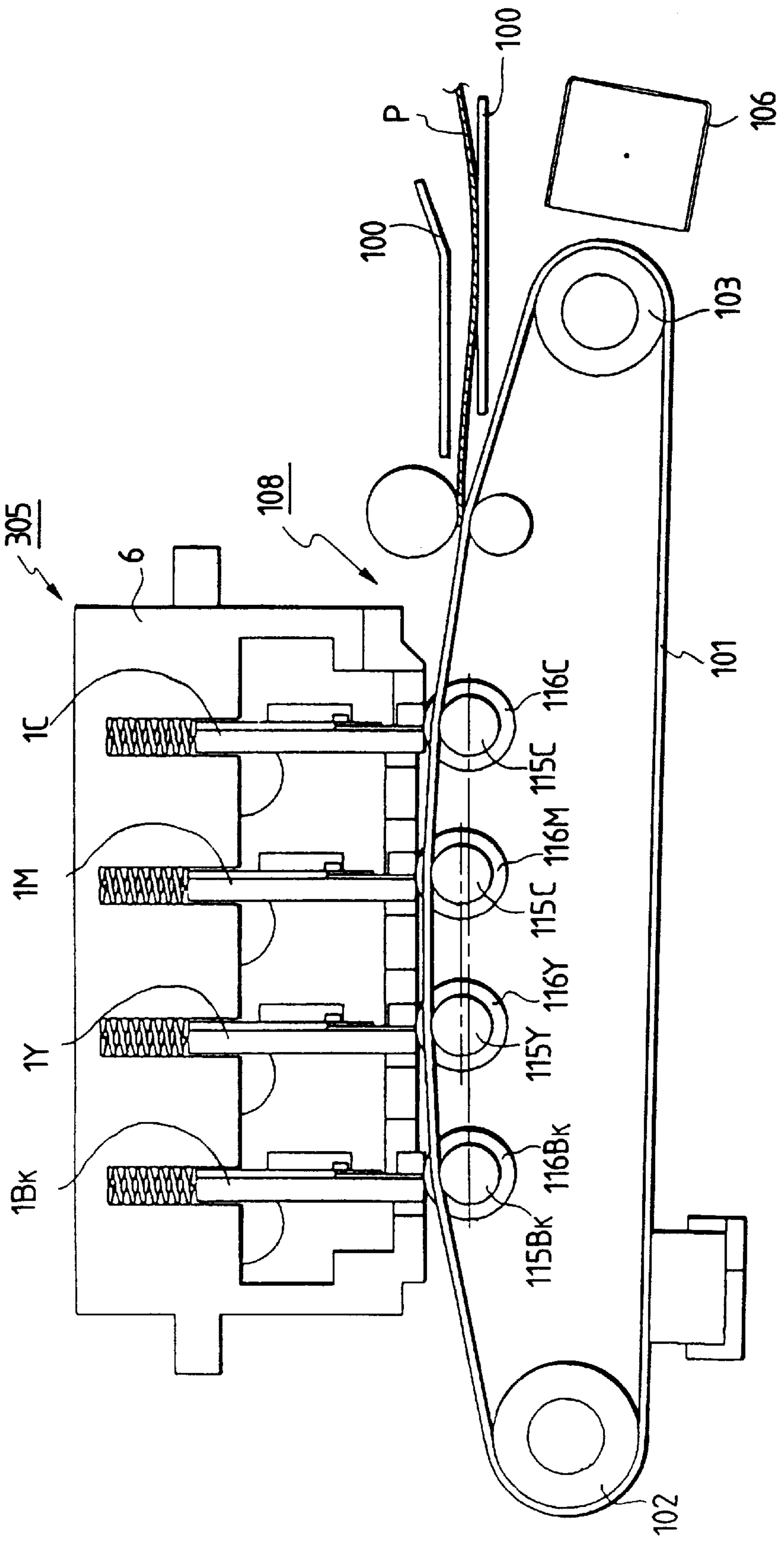
Figure 31:
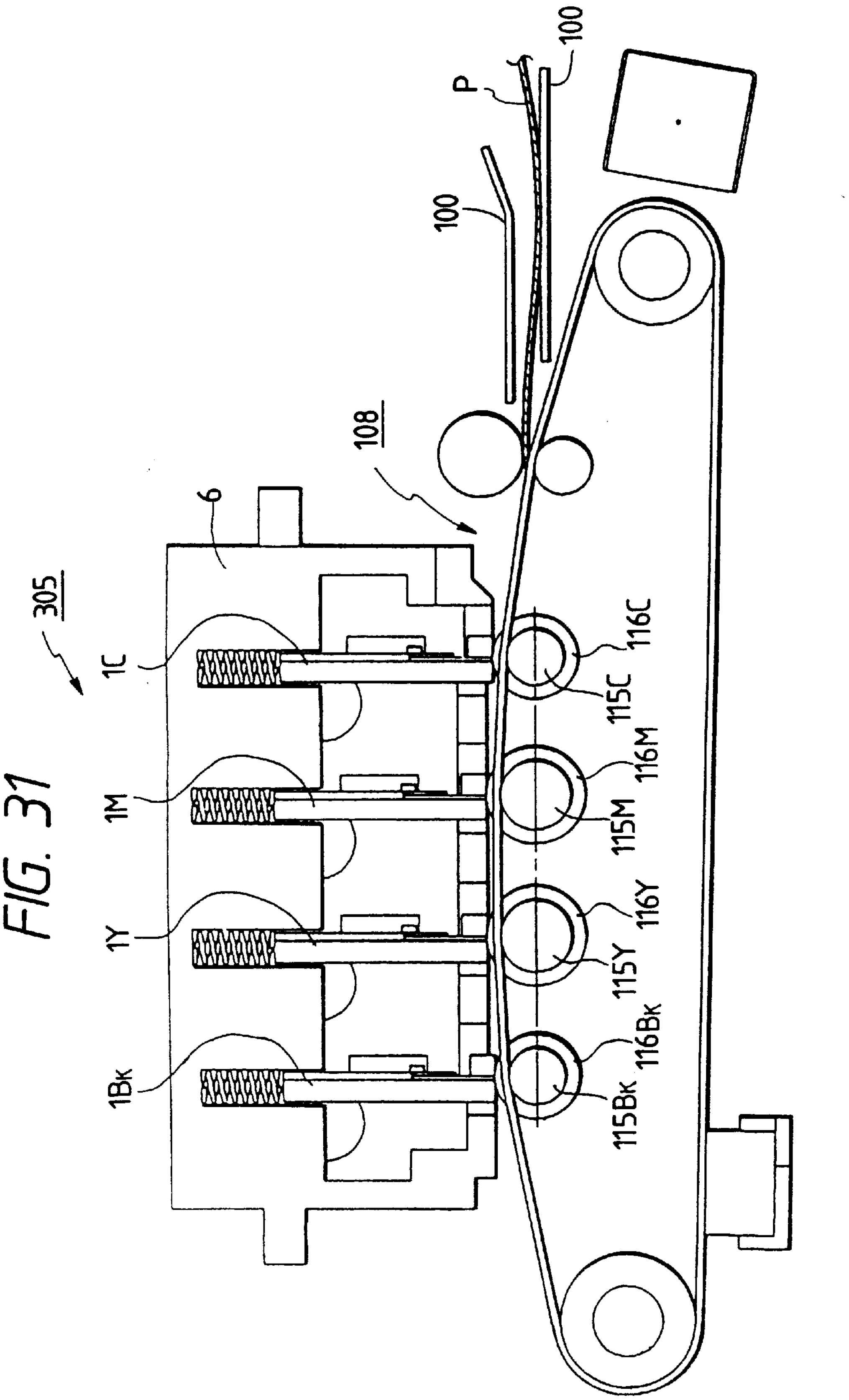

Other example of practice is shown in FIGS. 29, 30, 31. Since recording heads 1C–1Bk are generally very thin and a plural number of recording heads are arranged within a limited space, there may be cases where a spring 117 cannot be provided for each recording head as illustrated in FIG. 27.

In such case, a positioning axis 130 may be provided as positioning means as illustrated in FIG. 29. Positioning axis 130 has a one-way section at both ends and spring 117 contacts thereto. Head block 6 has such construction that it allows the movement of the said positioning axis 130 in the direction of arrow B.

Utilizing the upper part of this positioning axis 130 as the contact standard, the recording heads 1C, 1M, 1Y and 1Bk are fixed, for example, by a supporting means. The distance between the carrier belt 101 and recording heads 1C–1Bk is set, as in the case of foregoing examples, by the pushing roller 116 which pushes against the member at the head side and by winding the carrier belt around the back-up roller 115, but in this example, it is set by the contact of roller 116 against the lower part of the said positioning axis 130. Also in this case, the pushing roller 116 and positioning axis 130 are provided at both sides of the recording heads 1C–1Bk so that there should be no difference in clearance between front side and rear side.

Another example of practice is shown in FIGS. 30 and 31. In this case, it is so constructed that the plane at which 116M and 116Y, i.e., the two inside back-up rollers, out of four back-up rollers arranged from the upstream side in the direction of moving of the carrier belt 101, contact the carrier belt is above the plane at which 116C and 116Bk, i.e., the two outside back-up rollers contact the carrier belt. In FIG. 30, the centers of the two inside back-up rollers are shifted upward and in FIG. 31, the outer diameter of two inside back-up rollers and pushing roller are made larger. By so arranging, even when the center of the back-up rollers 115C–115Bk may deviate somewhat, the carrier belt 101 contacts all the rollers and the positions of the recording heads 1C–1Bk are respectively set and therefore printing can be made with accurate distance.

As stated above, by positioning the rotatively supported carrier guide member which guides the carrier to carry the recording sheet, a plural number of heads or the positioning means which fixes plural number of heads, via the pushing roller, the space between the nozzle surface of recording head and the recording surface of the recording sheet can be maintained accurately and the moving accuracy of the carrier is maintained at a high level and thus high quality images free from irregularity of lines or in the case of color printing, free from color aberration or irregularities is obtained.

In the case of the aforesaid apparatus, the recording head section covers the entire sheet width and therefore it is possible to obtain image recording for the entire surface of the recording sheet simply by conveying the recording sheet under the recording head section 305 and therefore printing can be made at the higher speed than the case of the said serial scanning system. Recording head section 301 does not need to move its scanning position at the time of recording and therefore the image can be formed with even higher stability.

We claim:

1. A recording method for retaining a recording medium on a retaining surface of an endless belt to perform color image recording on a recording surface of the recording medium, said method comprising the steps of:

disposing the endless belt around two roller members;

arranging a plurality of ink jet recording heads, each for discharging one of mutually different inks, along a conveyance direction of the recording medium by the endless belt and opposing the recording surface of the recording medium on the endless belt at positions between the two roller members;

electrifying the endless belt;

attracting the recording medium onto the electrified endless belt by static electricity; and conveying the endless belt by a plurality of additional roller members arranged between the two roller members, each of the plurality of additional roller members being opposed to a different one of the plurality of ink jet recording heads, maintaining a predetermined distance relative to the plurality of ink jet recording heads and in a manner that an area of the endless belt opposed to the plurality of ink jet recording heads is nearer to the plurality of ink jet recording heads than a position of a common tangent of the two roller members to perform ink jet recording onto the recording medium.

2. A method according to claim 1, further comprising the step of performing ink jet recording on the recording medium, wherein in said recording step electrothermal converting members in the plurality of ink jet recording heads generate heat to discharge ink to the recording surface of the recording medium.

3. A method according to claim 1, wherein the plurality of additional roller members contact a side of the endless belt that is opposite the retaining surface.

4. A method according to claim 1, wherein one of the plurality of additional roller members contacts the endless belt at a plane nearer to the plurality of ink jet recording heads than a plane at which another of the plurality of additional roller members contacts the endless belt.

5. A method according to claim 4, wherein the one of the plurality of additional roller members has an axis nearer to the plurality of ink jet recording heads than an axis of the other of the plurality of additional roller members.

6. A method according to claim 4, wherein the one of the plurality of additional roller members has a larger diameter than a diameter of the other of the plurality of additional roller members.

* * * * *

UNITED STATES PATENT AND TRADEMARK OFFICE

CERTIFICATE OF CORRECTION

PATENT NO. : 5,936,651

DATED : August 10, 1999

INVENTOR(S) : TAKASHI UCHIDA, ET AL.

It is certified that error appears in the above-identified patent and that said Letters Patent is hereby corrected as shown below:

COLUMN 1:
Line 46, "a" should be deleted;
Line 47, "a" should be deleted; and
Line 51, "4,723,1219." should read --4,723,129.--.

COLUMN 5:
Line 45, "402," should read --302,--.

COLUMN 6:
Line 12, "had" should read --head--.

COLUMN 7:
Line 24, "shaft 1." should read --shaft ℓ.--.

COLUMN 10:
Line 50, "therefrom ," should read --therefrom,--.

COLUMN 11:
Line 48, "stand-by-state" should read --stand-by state--

UNITED STATES PATENT AND TRADEMARK OFFICE

CERTIFICATE OF CORRECTION

PATENT NO. : 5,936,651

DATED : August 10, 1997

INVENTOR(S) : TAKASHI UCHIDA, ET AL.

It is certified that error appears in the above-identified patent and that said Letters Patent is hereby corrected as shown below:

COLUMN 12:

Line 66, "sin" should read --in--.

Signed and Sealed this

Third Day of April, 2001

Attest:

NICHOLAS P. GODICI

Attesting Officer

*Acting Director of the United States Patent and Trademark Office*